United States Patent
Kundermann et al.

(10) Patent No.: US 6,860,373 B2
(45) Date of Patent: Mar. 1, 2005

(54) ROTARY DRIVING INSERTION CONNECTION, PARTICULARLY FOR TRANSMITTING TORQUE IN A DRIVETRAIN OF A MOTOR VEHICLE

(75) Inventors: Wolfgang Kundermann, Schweinfurt (DE); Jochen Kuhstrebe, Biebelried/Westheim (DE); Wolfgang Reisser, Sennfeld (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/365,362

(22) Filed: Feb. 12, 2003

(65) Prior Publication Data

US 2003/0150684 A1 Aug. 14, 2003

(30) Foreign Application Priority Data

Feb. 14, 2002 (DE) .......................................... 102 05 996

(51) Int. Cl.⁷ .............................................. F16D 1/108
(52) U.S. Cl. ..................................... 192/70.16; 464/167
(58) Field of Search .......................... 192/70.16, 70.15, 192/110 B, 105 CD; 464/167

(56) References Cited

U.S. PATENT DOCUMENTS

| | | | | |
|---|---|---|---|---|
| 2,069,527 A | * | 2/1937 | Kirkland ...................... 81/53.2 |
| 3,696,901 A | * | 10/1972 | Henry .................. 192/105 CD |
| 5,624,318 A | * | 4/1997 | Jacob et al. ................. 464/167 |
| 5,647,801 A | * | 7/1997 | Jacob ......................... 464/167 |
| 5,653,320 A | * | 8/1997 | Vickerman .............. 192/110 B |
| 5,672,110 A | * | 9/1997 | Kurita et al. .................. 192/45 |
| 6,095,693 A | * | 8/2000 | Fujiwara ...................... 192/45 |
| 6,251,021 B1 | * | 6/2001 | Jacob .......................... 464/167 |
| 6,298,966 B1 | * | 10/2001 | Mimura ........................ 192/45 |
| 6,454,074 B1 | | 9/2002 | Kundermann et al. ... 192/87.11 |
| 6,464,059 B1 | | 10/2002 | Kundermann et al. ... 192/87.11 |
| 6,491,149 B1 | | 12/2002 | Kundermann et al. ..... 192/48.9 |
| 6,499,578 B1 | | 12/2002 | Kundermann et al. ... 192/87.11 |

FOREIGN PATENT DOCUMENTS

| DE | 660 546 | 5/1938 |
|---|---|---|
| DE | 687 525 | 1/1940 |
| DE | 2 062 416 | 8/1972 |
| DE | 100 04 195 | 4/2001 ........... F16D/21/06 |

* cited by examiner

Primary Examiner—Rodney H. Bonck
(74) Attorney, Agent, or Firm—Cohen, Pontani, Lieberman & Pavane

(57) ABSTRACT

A rotary driving insertion connection, particularly for transmitting torque in a drivetrain of a motor vehicle between components or units of the drivetrain which are connected or are to be brought into a connection for transmitting torque, comprises a primary-side coupling area at a first component and a secondary-side coupling area at a second component. One of the coupling areas has a cutout which is defined by an inner circumference or at least an inner circumferential portion, and the other coupling area has at least one projecting portion having an outer circumference or at least an outer circumferential portion which is inserted or can be inserted into the cutout axially with reference to an axis of rotation in order to provide a positive rotary driving engagement between the inner circumference and the outer circumference. A plurality of coupling elements producing the positive rotary driving engagement is provided between the inner circumference and the outer circumference.

26 Claims, 17 Drawing Sheets

ROTARY DRIVING INSERTION CONNECTION, PARTICULARLY FOR TRANSMITTING TORQUE IN A DRIVETRAIN OF A MOTOR VEHICLE

BACKGROUND OF THE INVENTION

1. Field of the Invention

The invention is directed generally to an axial insertion assembly connection for rotary driving or transmission of torque between components or units, e.g., of a drivetrain in a motor vehicle, for example, between a combustion engine and a torque transmission device (for example, a friction clutch, a dual clutch or a torque converter), possibly with the intermediary of a torsional vibration damper or a dual mass flywheel. Somewhat more concretely, the invention is directed to a rotary driving insertion connection, particularly for transmitting torque in a drivetrain of a motor vehicle between components or units of the drivetrain which are connected or are to be brought into a connection for transmitting torque, comprising a primary-side coupling area at a first component and a secondary-side coupling area at a second component, at least one of which has a cutout which is defined by an inner circumference or at least an inner circumferential portion (also called inner circumference hereinafter) and the other coupling area has at least one projecting portion having an outer circumference or at least an outer circumferential portion (also called outer circumference hereinafter) which is inserted or can be inserted into the cutout axially with reference to an axis of rotation in order to provide a positive rotary driving engagement between the inner circumference and the outer circumference.

2. Description of the Related Art

The prior art in this regard discloses axially insertable shaft connections with teeth. Because they must be assembled and because of the necessary manufacturing tolerances or those manufacturing tolerances occurring in practice, shaft connections of this type are subject to play. Annoying rattling noises can occur as a result of engine vibrations, particularly when the engine is idling. For example, there is a risk of intensive engine vibrations and, therefore, annoying rattling noises when the insertable shaft connection is provided between a clutch or dual clutch and a dual mass flywheel, since in this case the clutch or dual clutch is generally the secondary-side flywheel mass of the dual mass flywheel. Further, there is also a risk of intensive engine vibrations and, consequently, annoying rattling noises, for example, when the insertable shaft connection is provided between a drive unit (particularly a combustion engine) and a torque converter, since the converter generally forms the flywheel mass of the drive unit (of the engine).

SUMMARY OF THE INVENTION

It is the object of the invention to provide a rotary driving insertion connection of the type mentioned above which ensures at least additional degrees of freedom in construction, so that, for example, the problems of conventional insertable shaft connections mentioned above can be avoided or at least mitigated. In order to meet this object, it is proposed that a plurality of coupling elements are provided for arrangement between the inner circumference and the outer circumference for the positive rotary driving engagement.

Insofar as there is no direct positive rotary driving engagement between the inner circumference and the outer circumference, the coupling elements allow additional degrees of freedom for solving the problems confronting the designer. For example, the coupling elements make it possible to design the rotary driving insertion connection in such a way that torque can be transmitted via the rotary driving insertion connection substantially without play and, therefore, substantially without noise, while preserving simplicity of assembly to a great extent. For this purpose, the coupling elements preferably have movement play between the inner circumference and the outer circumference and can be displaced into an engagement position in which they bring about a positive rotary driving engagement between the inner circumference and the outer circumference substantially without play. The coupling elements bring about the positive rotary driving engagement substantially without play only in the engagement position, and it can be provided that the coupling elements are only displaced or displaceable to the engagement position after assembly, possibly only during operation, or that the coupling elements can be displaced out of the engagement position into an assembly position, for example, for assembly.

In this connection, the main idea is that the coupling elements are displaceable between the engagement position and an assembly position or can be positioned in the assembly position at least for a determined assembly process. In the assembly position, the coupling elements ensure play which makes possible or facilitates the insertion of the projecting portion into the cutout.

According to an advantageous embodiment, the coupling elements can be displaced into the engagement position based on centrifugal forces occurring in operation. Another likewise advantageous possibility consists in providing a spring arrangement which is associated with the coupling elements and constructed for displacing the coupling elements into the engagement position or at least holding the coupling elements in the engagement position.

It is ensured that expenditure on assembly is comparatively small or at least not excessive in that, for example, at least a portion of the plurality of coupling elements is grouped into a coupling element group that can be handled as a unit by means of a grouping arrangement which limits the movement play of the coupling elements relative to one another and/or which connects the coupling elements to one another, and/or at least a portion of the plurality of coupling elements is held by means of a/the grouping arrangement in a reference position (possibly the assembly position) relative to the associated inner circumference and/or relative to the associated outer circumference. For this purpose, the grouping arrangement can include a coupling element cage. The coupling element cage can advantageously be constructed so as to be radially elastic or radially flexible and/or can ensure axial and/or radial play of the coupling elements.

The grouping arrangement can comprise at least one elastomer material element connecting the coupling elements to form an elastomer composite. Further, the grouping arrangement can have at least one strip material element or layer material element which connects the coupling elements to one another and/or holds them in a reference position.

In general, the inner circumference and the outer circumference can advantageously define an annular gap or a plurality of individual gaps which are offset relative to one another in circumferential direction, wherein the annular gap or the respective individual gap has a gap width which decreases in axial direction and which receives the coupling elements or at least one coupling element. In this connection, the outer circumference can have, at least in the area of the (respective) gap, an area portion which increases radially in the axial direction in which the gap width decreases. Further, the inner circumference can have, at least in the area of the (respective) gap, an area portion which increases radially in the axial direction in which the gap width decreases.

It can be provided in this connection that the area portion of the inner circumference increases radially to a greater extent than the area portion of the outer circumference. However, it is preferable that the area portion of the outer circumference increases radially to a greater extent than the area portion of the inner circumference.

There are many possibilities with regard to the construction of the inner circumference and outer circumference. In general, the inner circumference or outer circumference is formed by surfaces (particularly diagonal surfaces) which are offset in circumferential direction with respect to one another, possibly so as to be separated by intermediate spaces or gaps. The surfaces can be constructed in a flat (plane) manner.

In order to be able to compensate for radial offset or relative tilting between the axes of rotation associated with the first component and second component, it is suggested that the inner circumference and/or the outer circumference are/is constructed in a radially elastic manner. In this connection, a preferred construction is characterized in that a spring arrangement which is associated with the respective component and which engages in a positive rotary driving engagement with a torque transmitting portion of the respective component forms the inner circumference and the outer circumference, respectively. The rotary driving engagement is preferably substantially without rotational play.

In a further development, it is suggested that the spring arrangement has spring tongues which are contiguous along an annular portion so as to form one piece, are offset relative to one another in circumferential direction, and form the inner circumference and the outer circumference, respectively, jointly with a respective side of the spring tongue. In another advantageous suggestion in this connection, the torque transmitting portion has another outer circumference enclosing the first outer circumference on the radial outer side and another inner circumference enclosing the first inner circumference on the radial outer side, and the spring arrangement engages at the other outer circumference and at the other inner circumference, respectively, in a positive engagement in such a way that, together with the coupling elements, it brings about a positive rotary driving engagement with the inner circumference and outer circumference of the other components. Owing to the spring arrangement, the rotary driving engagement has radial elasticity which can absorb the above-mentioned offset or tilting of the rotational axes. The rotary driving engagement is preferably substantially without rotational play.

Preferred embodiment forms are characterized in that the primary-side coupling area or the secondary-side coupling area has a polygon socket or internal polygon forming the inner circumference or the other inner circumference and/or that the primary-side coupling area or the secondary-side coupling area has a polygon projection or external polygon forming the outer circumference or the other outer circumference.

The coupling elements can advantageously be formed of rolling bodies or sliding bodies. For example, the coupling elements can be formed of bails or cylinders (rollers), wedge-shaped plates or plates which enable wedging (wedge plates).

The invention is further directed to a drivetrain in a motor vehicle with an insertion connection, according to the invention, between a drive unit (e.g., a combustion engine) or a torque transmitting device which is arranged after the drive unit and a torque transmitting device which is arranged in front of a transmission. The torque transmitting device arranged after the drive unit can have, for example, a torsional vibration damper arrangement and/or a dual mass flywheel arrangement or can form such an arrangement together with the torque transmitting device arranged in front of the transmission. The torque transmitting device in front of the transmission can have, for example, a clutch device and/or a torque converter device. The clutch device, for example, could be constructed as a dual clutch device or multiple-clutch device (in a wet multiple-plate clutch type construction, for example) having a first clutch arrangement associated with a first transmission input shaft and a second clutch arrangement associated with a second transmission input shaft.

In the following, the invention will be described with reference to embodiment examples shown in the drawings. The prior art is shown by way of example in FIGS. 1 to 3.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
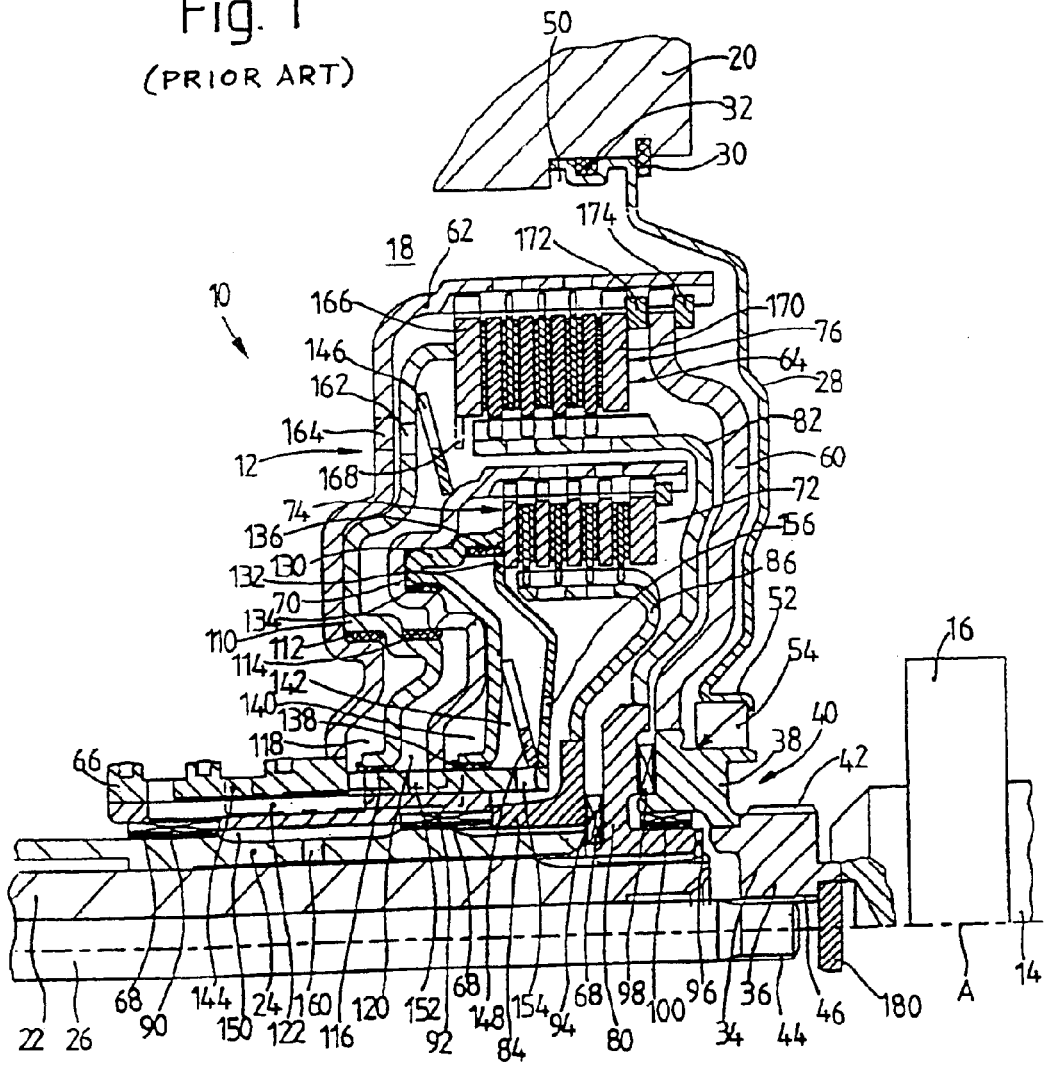
FIG. 1 is a partial section through a known dual clutch which is arranged in a drivetrain of a motor vehicle between a transmission and a drive unit and which has two multiple-plate clutch arrangements.

FIG. 1 shows a dual clutch 12 arranged in a drivetrain 10 between a drive unit and a transmission. A drive unit, e.g., an internal combustion engine, is indicated in FIG. 1 only by a driven shaft 14, possibly a crankshaft 14, with a coupling end 16 for coupling to a torsional vibration damper, not shown. The transmission is illustrated in FIG. 1 by a transmission housing portion 20 defining a transmission bell housing 18 and two transmission input shafts 22 and 24, both of which are constructed as hollow shafts. Transmission input shaft 22 extends through the transmission input shaft 24 substantially coaxial to the latter. A pump drive shaft which serves to drive a transmission-side oil pump, not shown in FIG. 1, is arranged in the interior of the transmission input shaft 22.

A coupling hub 34 which extends through a central opening of the cover 28 in the direction of the drive unit and is coupled with the torsional vibration damper, not shown, by means of an external toothing 42 serves as the input side of the dual clutch 12.

A carrier plate 60 which could also be referred to as a torque transmission member or driver is arranged at the hub 34 so as to be fixed with respect to rotation relative to it and serves to transmit torque between the hub 34 and an outer plate carrier 62 of a first multiple-plate clutch arrangement 64. For this purpose, the carrier plate 60 has teeth which engage in the teeth of the outer plate carrier 62 which couple the outer plates in a rotary driving manner. The outer plate carrier 62 extends in the direction of the transmission and radially inward to an annular part 66 at which the outer plate carrier is arranged so as to be fixed with respect to rotation relative to it and which is mounted at the two transmission input shafts 22 and 24 by means of an axial and radial bearing arrangement 68 in such a way that radial forces as well as axial forces are supported at the transmission input shafts. The axial and radial bearing arrangement 68 enables relative rotation between the annular part 66 and the transmission input shaft 22 on one hand and the transmission input shaft 24 on the other hand.

Further axially in direction of the drive unit, an outer plate carrier 70 of a second multiple-plate clutch arrangement 72 is arranged at the annular part 36 so as to be fixed with respect to rotation relative to it, the plate stack 74 of this second multiple-plate clutch arrangement 72 being enclosed annularly by the plate stack 76 of the first multiple-plate clutch arrangement. The two outer plate carriers 62 and 70 are connected with one another by the annular part 66 so as to be fixed with respect to relative rotation and are jointly in a torque-transmitting connection to the coupling hub 34 and, accordingly, by means of the torsional vibration damper, not shown, to the crankshaft 14 of the drive unit by means of the carrier plate 60 which is in a positive torque-transmitting engagement with the outer plate carrier 62 by means of an outer toothing. With respect to the normal flow of torque from the drive unit to the transmission, the outer plate carriers 62 and 70 serve, respectively, as the input side of the multiple-plate clutch arrangement 64 and 72.

A hub part 80 of an inner plate carrier 82 of the first multiple-plate clutch arrangement 64 is arranged on the transmission input shaft 22 so as to be fixed with respect to rotation relative to it by means of a keyway toothing or the like. A hub part 84 of an inner plate carrier 86 of the second torque transmitting device 72 is arranged in a corresponding manner on the radial outer transmission input shaft 24 so as to be fixed with respect to rotation relative to it by means of a keyway toothing or the like. With respect to regular torque flow from the drive unit in the direction of the transmission, the inner plate carriers 82 and 86 serve as the output side of the first and second multiple-plate clutch arrangements 64 and 72, respectively.

Actuating pistons for actuating the multiple-plate clutch arrangements are integrated in the dual clutch 12 in the present embodiment example for actuating the multiple-plate clutch arrangements for the purpose of engagement.

For further details and advantageous constructions of the dual clutch 12, reference is had to U.S. Pat. Nos. 6,464,059 and 6,454,074, incorporated herein by reference, and DE 100 04 189, DE 100 04 190, and DE 100 04 195. FIG. 1 of the present application corresponds to FIG. 1 of this series of applications belonging to a patent family. DE 100 04 189 and DE 100 04 190 correspond to respective U.S. Pat. Nos. 6,499,578 and 6,491,149, which are also incorporated by reference.

Figure 2:
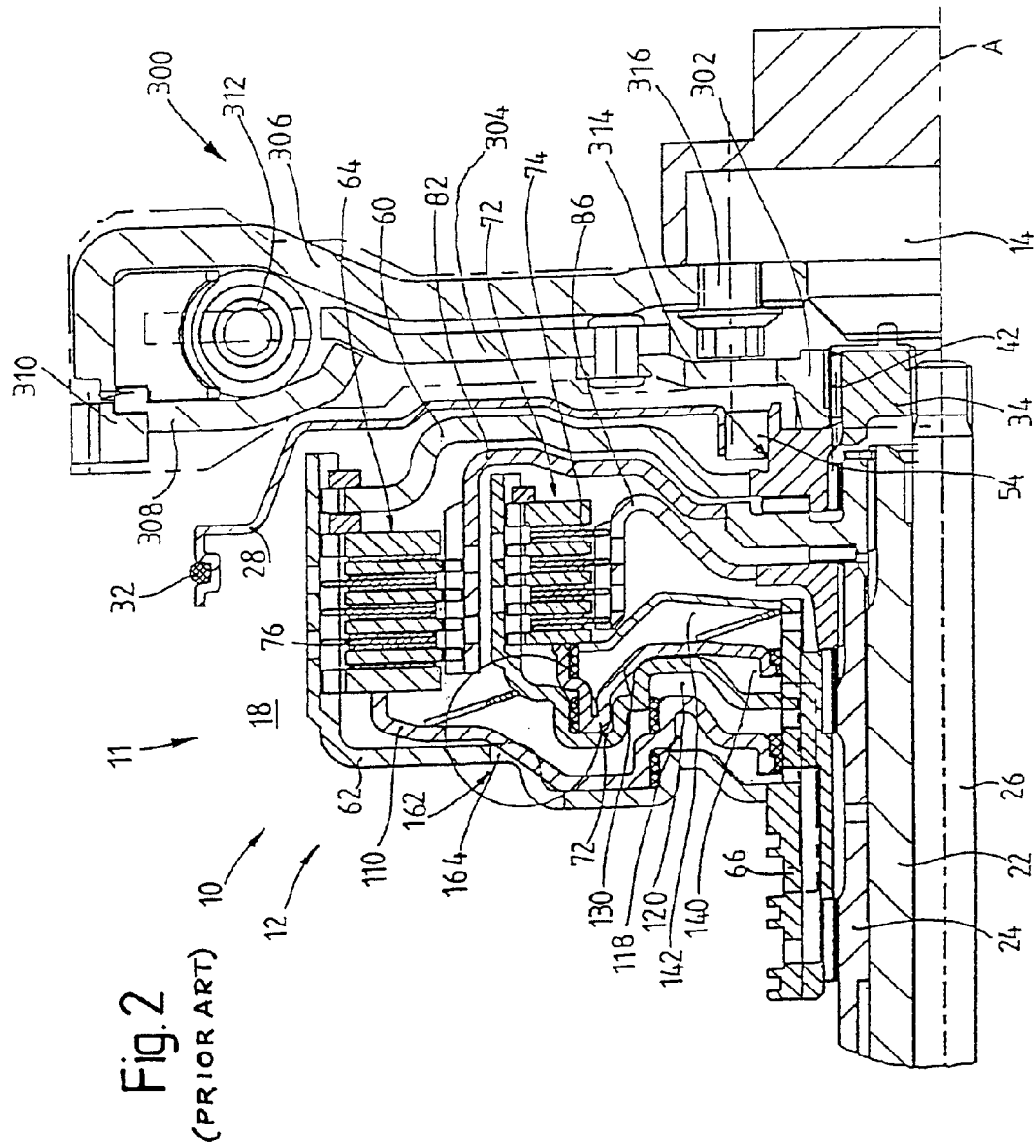
FIG. 2 shows a variant of the dual clutch with torsional vibration damper coupled thereto.

FIG. 2 shows a combination of a dual clutch 12 and a torsional vibration damper 300. The dual clutch 12 and the torsional vibration damper 300 (like the dual clutch in FIG.

1) can be mounted in a simple manner in a drivetrain. This is due particularly to the fact that the dual clutch 12 and the torsional vibration damper 300 can be mounted independent from one another at the transmission (dual clutch) and at the drive unit (torsional vibration damper) and that the transmission and the drive unit, including the system parts (dual clutch and torsional vibration damper, respectively) arranged on the latter, can then be joined in a simple manner by coupling the secondary side of the torsional vibration damper to the input side (in this case, the coupling hub 34) of the dual clutch, specifically by means of the outer toothing 42 of the coupling hub 34 and an associated inner toothing of a hub portion 302 of the disk part 304 of the torsional vibration damper 300 forming the secondary side.

In order to facilitate the mounting of the torsional vibration damper 300 at the crankshaft, the disk part 304 has tool access openings 314 through which screw bolts 316 which fasten the cover plate 306 to the crankshaft and coupling end 14 of the crankshaft can be tightened by means of a suitable tool.

Figure 13:
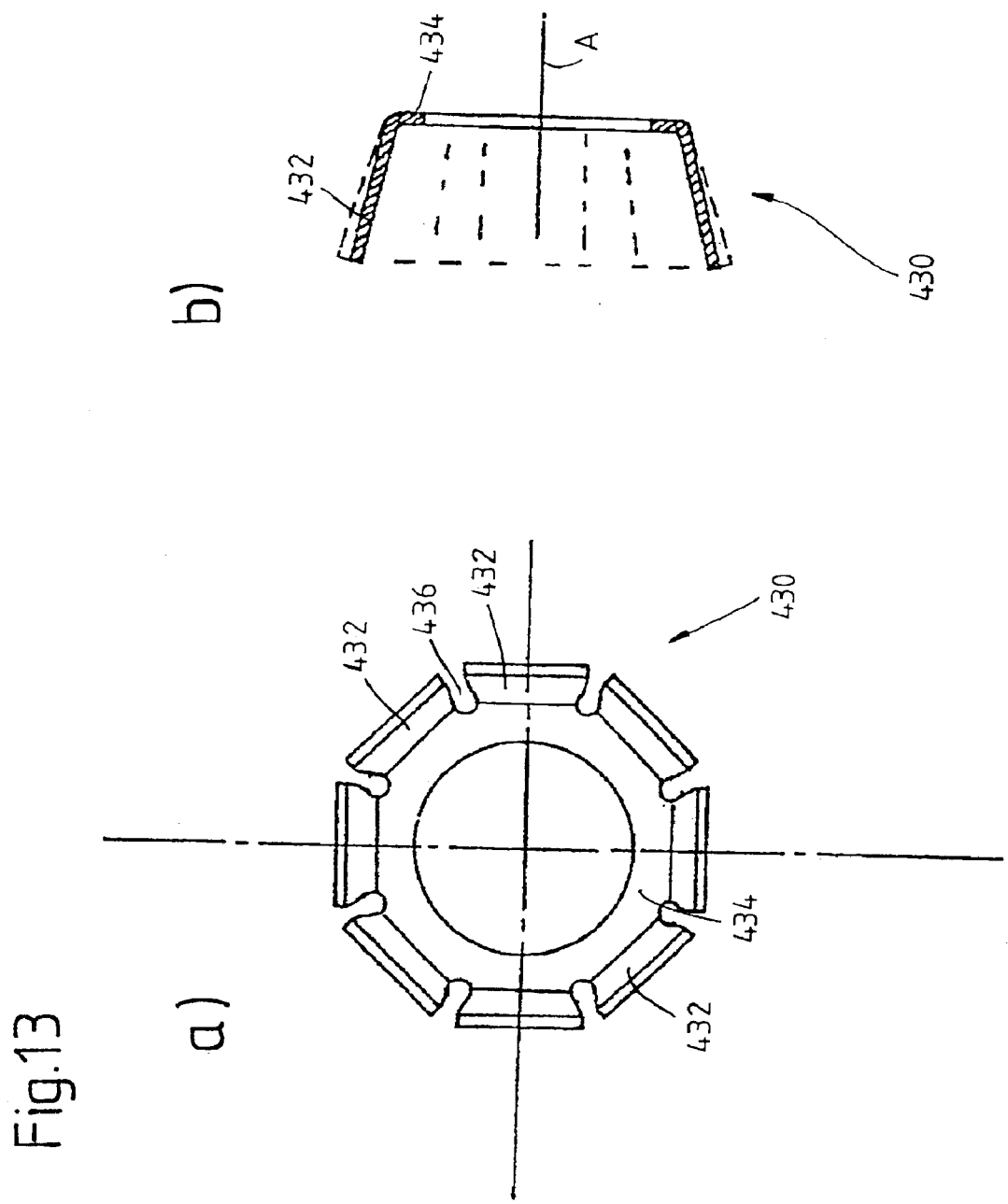
FIG. 13 shows an axial view (FIG. 13a) and a sectional view (FIG. 13b) of a spring element which, in the embodiment form in FIG. 12, together with the coupling elements, brings about the positive rotary driving engagement and ensures radial compensation.

The primary side of the torsional vibration damper 300 is formed by the (first) cover plate 306 arranged at the crankshaft and a (second) cover plate 308 which is arranged at the latter and which has a starter ring gear 310 by which the drive unit can be started by means of a starter, not shown, in case the drive unit is constructed as an internal combustion engine. A damper element arrangement 312 of the torsional vibration damper 300 is received in a manner known per se in cutouts of the disk part 304 between the two cover plates 306 and 308 which have indentations, supporting parts or the like engaging between damper elements adjoining in circumferential direction, so that a primary-side and secondary-side support of the damper element arrangement in circumferential direction is ensured. The damper elements can be supported and guided by means of spring plates, sliding blocks and the like. Reference is had to the explanations in the publications cited above, e.g., FIG. 13 in U.S. Pat. No. 6,464,059, for further details on the arrangement shown in FIG. 2.

Figure 3:
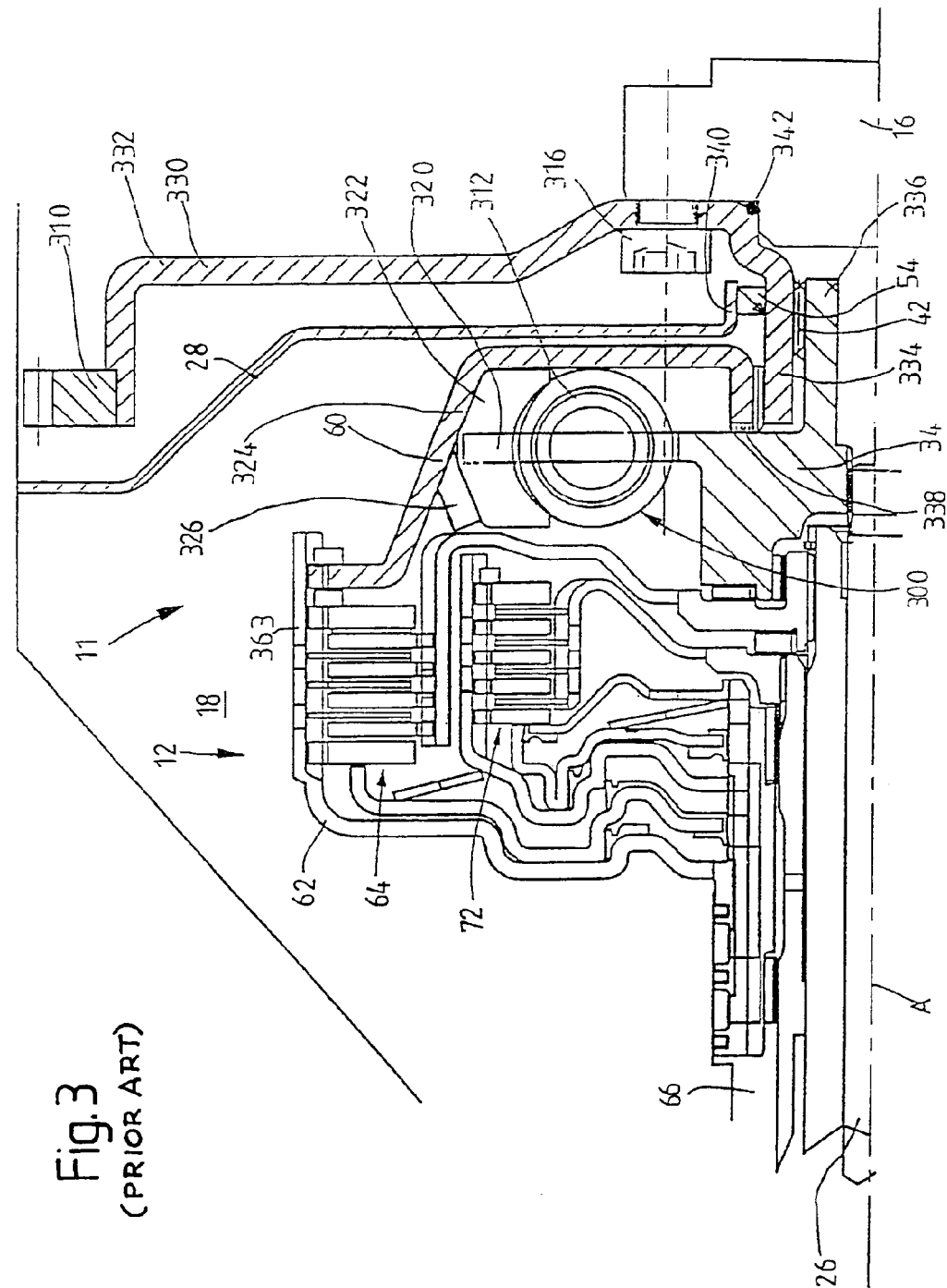
FIG. 3 shows another known dual clutch with integrated torsional vibration damper arrangement.

In the drive system 11 of FIG. 3, the torsional vibration damper 300 is integrated in the dual clutch. For this purpose, the coupling hub 34 has radial webs 320, the damper elements (damper springs) of the damper element arrangement 312 which are nested one inside the other being received in these radial webs 320. The coupling hub 34 serves as the primary side of the torsional vibration damper 300.

The drive system 11 in FIG. 3 has a coupling arrangement for coupling the dual clutch 12 to the drive unit, specifically to the coupling end 16 of the crankshaft. The coupling arrangement 320 is formed by a flexplate 332 which carries, at the radial outer side, a starter ring gear 310 acting as a primary-side added mass with respect to the torsional vibration damper 300. The flexplate 332 is formed on the radial inner side by a coupling flange 334 that extends in axial direction and has an inner toothing for coupling to the outer toothing 42 of the coupling hub 34. In the present embodiment example, the outer toothing 42 is provided at an axial coupling flange 336 of the coupling hub 34. For further details on the embodiment example shown in FIG. 3, reference is had to the descriptions in the above-cited publications.

The examples in FIGS. 1 to 3 show, by way of example, a conventional axially insertable assembly connection between components or units of a drivetrain, e.g., between an internal combustion engine and a torque transmission device or, in the examples, the dual clutch, possibly with the intermediary of a torsional vibration damper (or dual mass flywheel). In practice, the axially insertable toothed connections shown in the drawing (which may also be designated as shaft connections, as the case may be) are subject to rotational play in view of conveyor belt assembly and in order to account for manufacturing tolerances. This can lead to annoying rattling noises, e.g., in the event of strong engine vibrations during engine idling, for example. Axially insertable assembly connections with teeth have also already been considered for coupling torque converters to internal combustion engines and have the same problems. Embodiment examples, according to the invention, with an axially insertable assembly connection (rotary driving insertion connection) which enables torque transmission substantially without play and substantially without noise are shown in the following.

According to a particularly advisable construction, the invention replaces the conventional insertion toothing with an insertion connection having movable coupling elements which provide for a positive-engagement torque transmission substantially without play between a primary-side structural component part and a secondary-side structural component part. The movable elements can be formed by cylindrical rollers, balls or wedge-shaped plates, for example, and can be displaced into an engagement position in which they provide for the positive-engagement torque transmission between the primary-side structural component part and the secondary-side structural component part substantially without play by the action of centrifugal forces occurring in operation or by displacement forces applied in some another manner (for example, due to a corresponding spring pretensioning). Diagonal surfaces which are acted upon by the coupling elements can be provided at the primary-side structural component part and/or secondary-side structural component part, for example. A preferred construction is characterized by wedge gaps formed by corresponding diagonal surfaces at the primary-side and secondary-side structural component parts, the coupling elements entering into these wedge gaps until play is eliminated. The primary-side structural component part and the secondary-side structural component part (generally, the primary-side and secondary-side structural component parts) can advantageously be constructed as polygons which are formed as a projecting portion (positive shape) and a cutout (negative shape) and which are inserted one inside the other so as to define an intermediate space (possibly the wedge gap) for the movable coupling elements. The supporting surfaces which are exposed to the action of the coupling elements are preferably formed by metal surfaces and can be heat-treated if necessary. The coupling elements bringing about the rotary driving engagement are likewise preferably constructed as metal elements.

Reference numbers identical to those in FIGS. 1 to 3 are used for analogous or identical structural component parts in the drawings for the embodiment examples discussed in the following.

Figure 4:
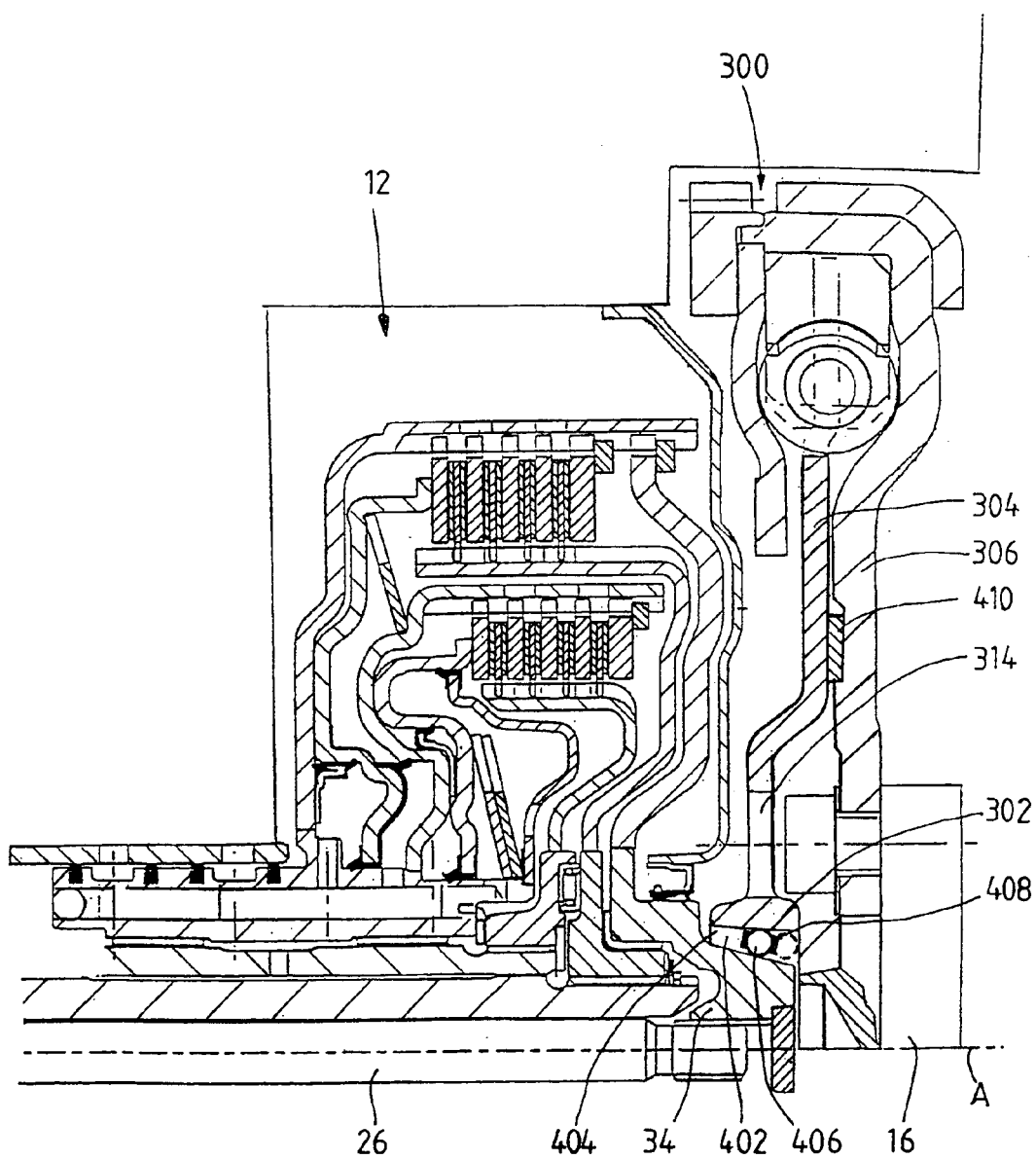
FIG. 4 shows a dual clutch according to the invention which has a torsional vibration damper arrangement coupled thereto in the form of a dual mass flywheel, wherein an input side of the dual clutch and an output side of the dual mass flywheel are coupled by means of a rotary driving insertion connection according to the invention.

FIG. 4 shows a corresponding embodiment example, specifically a rotary driving insertion connection, according to the invention, between a dual mass flywheel 300 and a dual clutch 12. The input hub 34 of the dual clutch 12 has a portion which is constructed as a conical external polygon, e.g., corresponding to the view in FIG. 6, and the hub part 302 of the secondary-side disk part 304 of the dual mass flywheel has a cutout 402 with an inner circumference which can also be designated as internal polygon and which encloses the external polygon and has inclined wedge surfaces. The external polygon and the internal polygon define a wedge gap 404 in which coupling elements 406 are received. The coupling elements 406 can be displaced into the wedge gap in an engagement position in which the external polygon is wedged with the internal polygon in a positive engagement. In FIG. 4, a coupling element 406 which is constructed as a roller is shown in the engagement position as illustrated by a solid line. The coupling element 406 is also shown, in dashed lines, in another assembly position located further in the direction of the drive unit in which a positive rotary driving engagement that is substantially without play is not produced between the hub 302 and the input hub 34. When the drive unit is started, the coupling elements which can be held together by a coupling element cage 408 for simple handling according to the view in FIG. 4 move compulsorily under the influence of centrifugal forces from the assembly position into the engagement position, that is, from an area of the wedge gap with a greater radial gap width into an area of the wedge gap with a smaller radial gap width. The rotary driving insertion connection is preferably constructed with respect to the shape and inclination of the wedge surfaces at the primary side and secondary side in such a way that the coupling elements remain in the previously occupied engagement position, or at most move out of this position slightly, also at the conclusion of operation, that is, when the drive unit is stopped. As a rule, the coupling elements are not intended to move out of the coupling position into the assembly position again when the drive unit is stopped. However, a construction of this kind which facilitates disassembly of the arrangement is certainly possible.

Figure 5:
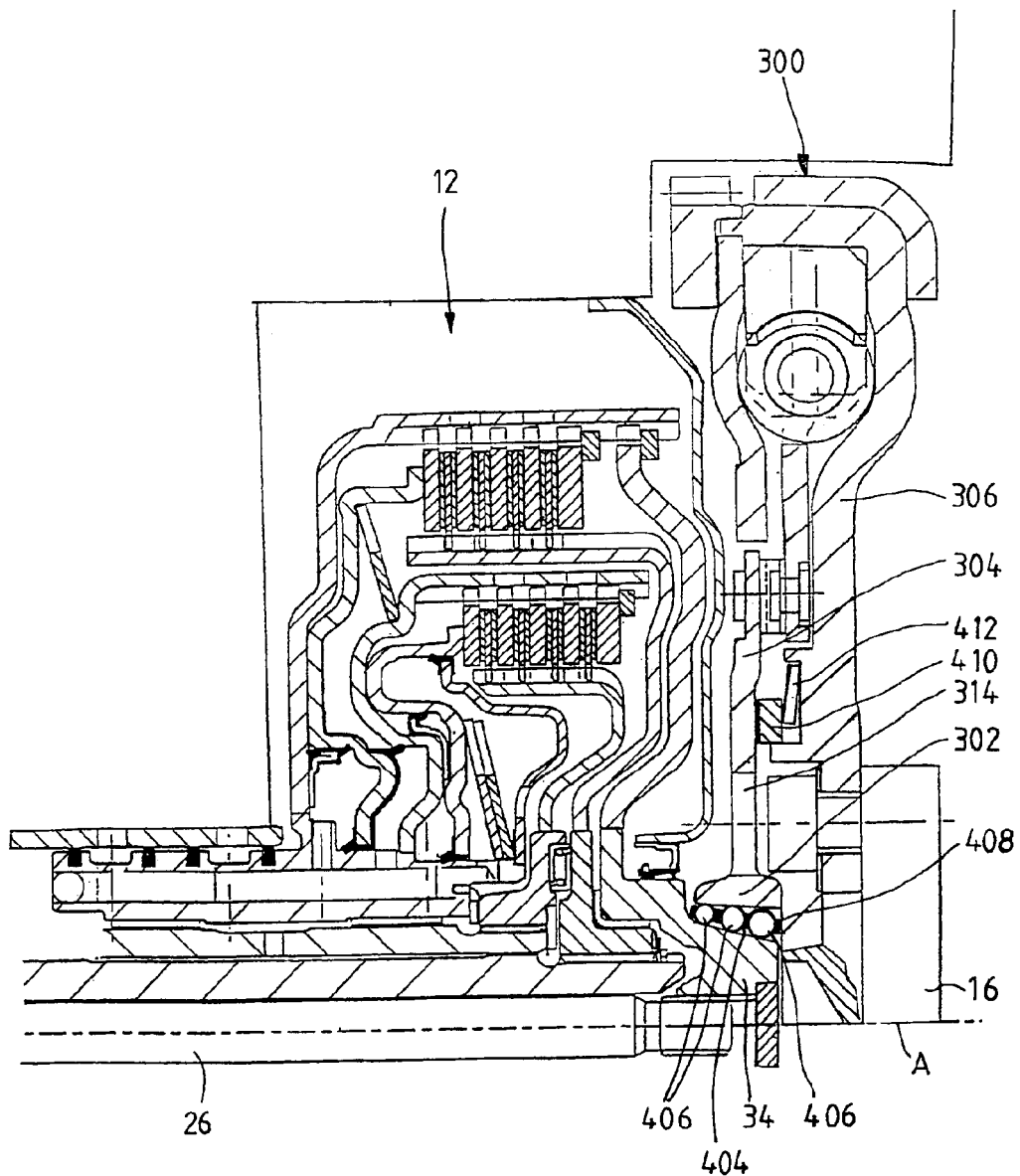
FIG. 5 shows a construction variant of the arrangement in FIG. 4.

According to FIG. 4, a row of coupling elements extending in circumferential direction are provided. However, FIG. 5 shows an embodiment example in which three rows of coupling elements 406 which are offset axially relative to one another are received in the wedge gap and received together in a coupling element cage 408. The coupling elements are constructed as rolling cylinders, wherein the diameter of the rolling cylinders decreases from row to row corresponding to the taper or narrowing of diameter of the wedge gap 404 in the direction of the transmission starting from the row closest to the drive unit (at right in FIG. 5).

In both embodiment examples in FIGS. 4 and 5, the wedge surfaces of the external polygon are more sharply inclined than the wedge surfaces of the internal polygon. The comparatively small cone angle of the wedge surfaces of the internal polygon ensures that the axial force component which occurs in operation due to the centrifugal force and which acts on the hub 302 in the direction of the drive unit remains small, so that only a correspondingly small axial force need be supported between the primary side 306 and the secondary side 304 of the dual mass flywheel 300. In FIG. 4, this support is carried out directly by means of a sliding ring 410 acting between the above-mentioned components. In this case, comparatively small tolerances must be ensured in order to have defined ratios. However, the embodiment form in FIG. 5 has an axially acting spring arrangement, particularly a plate spring 412, which applies the axial counterforce opposing the axial forces caused by centrifugal force to the hub 302 and ensures axial tolerance compensation. The axial forces exerted on the input hub 34 are supported on the transmission side by the axial bearing support of the dual clutch. The selection of the cone angle is a problem of optimization in which the occurring axial force components are weighed against the axial adjustment path until play is compensated. As a rule, it is desirable to achieve compensation of play relatively quickly when starting the engine.

Figure 6:
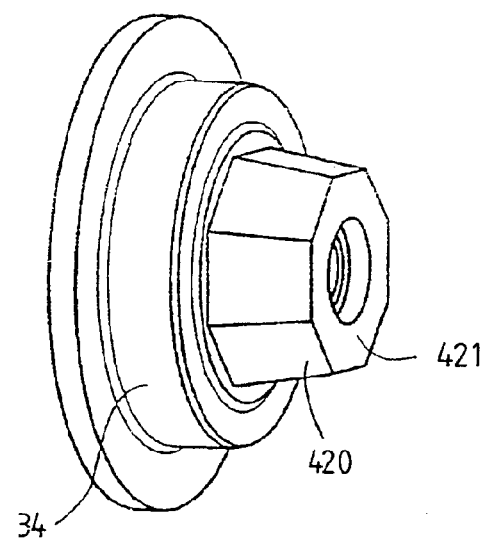
FIG. 6 shows a coupling area of an input hub associated with the input side of the dual clutch, which coupling area is associated with the rotary driving insertion connection and has a projecting portion.
Figure 7:
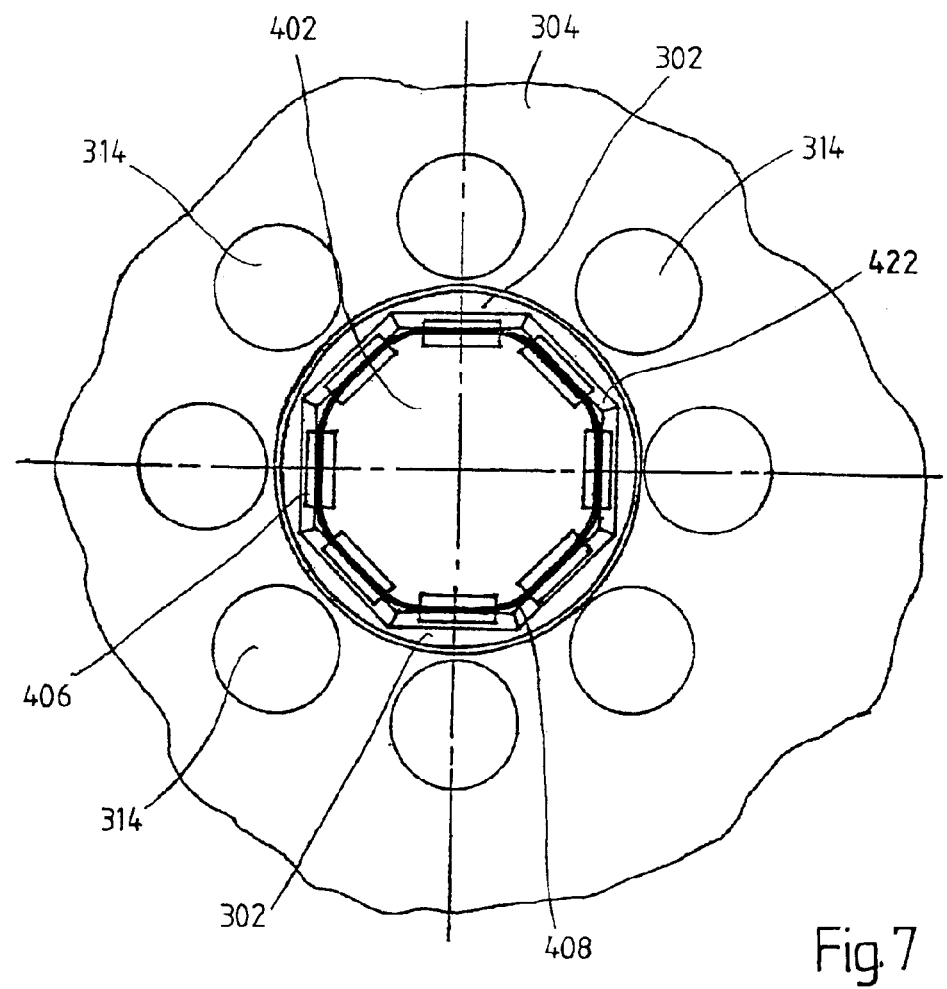
FIG. 7 shows a coupling area of the output side of the dual mass flywheel, which coupling area is associated with the rotary driving insertion connection and has a cutout, including an arrangement of coupling elements which are held together by a coupling element cage, which arrangement is received in the cutout.

FIG. 6 and FIG. 7 show a preferred embodiment form of a primary-side coupling area and a secondary-side coupling area of a rotary driving insertion connection according to the invention, including an associated group of coupling elements which are held together by a coupling element cage.

FIG. 6 shows, in particular, an external polygon 420 which can be associated with or formed at the input hub or input shaft 34 of a dual clutch, for example, corresponding to the preceding embodiment examples in FIGS. 4 and 5. A corresponding construction of the input hub or input shaft itself in which the external polygon is an integral component part of the input hub or input shaft is conceivable. It is assumed in the following remarks that FIG. 6 shows the input hub 34 from FIGS. 4 and 5.

FIG. 7 is an axial view showing the internal polygon 422 which defines a corresponding cutout 402. The cutout 402 can be conceived of as a negative image of a corresponding external polyhedron (that is, of a corresponding positive shape). According to the above assumptions, the internal polygon is formed in the secondary-side hub 302 of the dual mass flywheel 300 of the embodiment examples of FIGS. 4 and 5 and is constructed in the present case as a through-opening in the hub 302 which is open on both axial sides. However, the cutout could also be constructed so as to be open axially only on one side.

FIG. 7 shows the cutout 402 and, inserted therein, a group of coupling elements comprising the coupling elements 406 and a coupling element cage 408 which holds together the coupling elements to form an arranged group.

Figure 8:
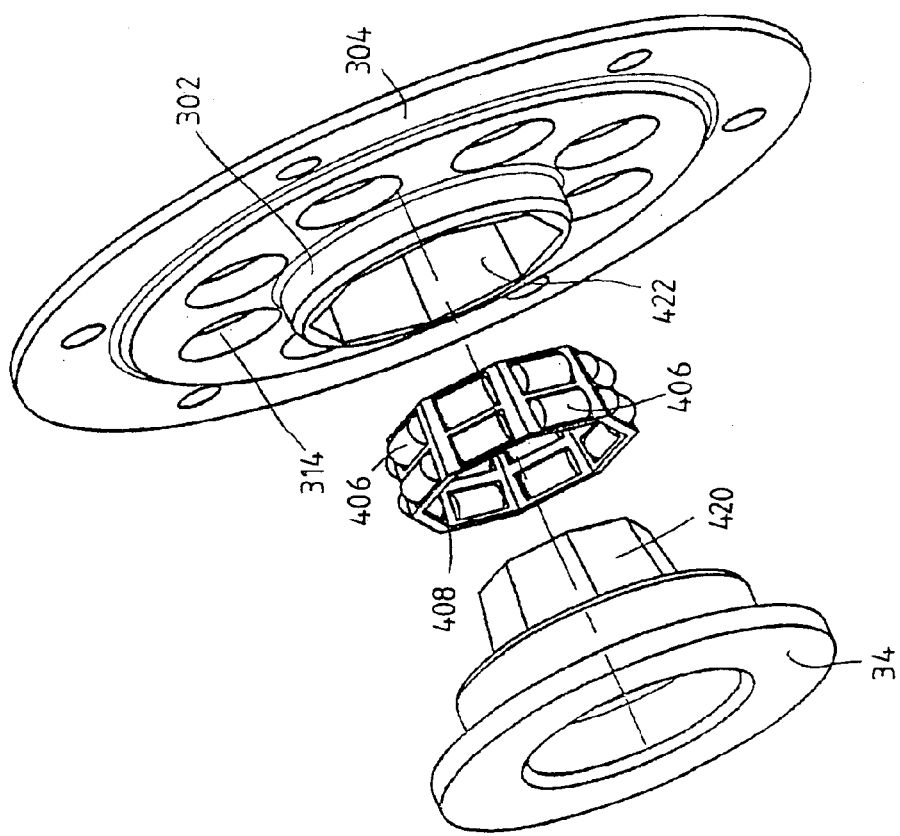
FIG. 8 is a perspective exploded view showing the coupling area having the projecting portion, the coupling element cage, including the coupling elements, and the coupling area having the cutout.

FIG. 8 shows the components of FIGS. 6 and 7 in a perspective exploded view. The plane wedge surfaces of the external polygon 420 which form an outer circumference at the input hub 34 and the plane wedge surfaces of the internal polygon 422 which form an inner circumference of the hub 302 of the secondary side of the dual mass flywheel 300 can be easily discerned. In contrast to FIGS. 4 and 5, two axially staggered annular rows of coupling elements 406 are provided and are arranged in a corresponding coupling element cage 408.

Figure 9:
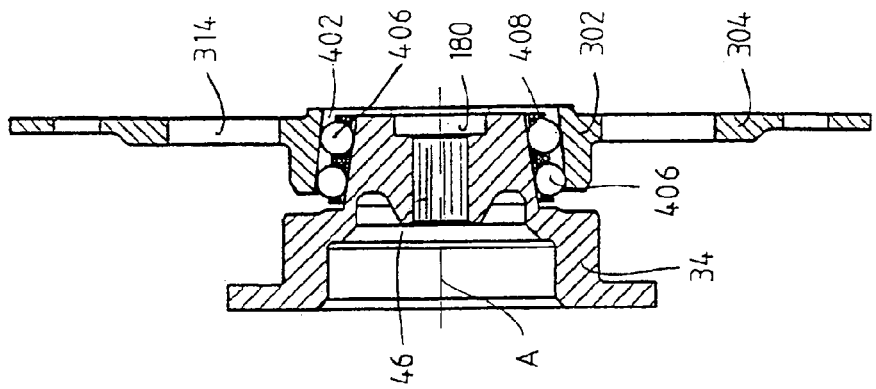
FIG. 9 is a sectional view showing the components of FIG. 8 in the state in which the projecting portion is inserted into the cutout, wherein the coupling element cage, including the coupling elements, is received between the inner circumference of the cutout and the outer circumference of the projecting portion in order to bring about a positive rotary driving engagement.
Figure 10:
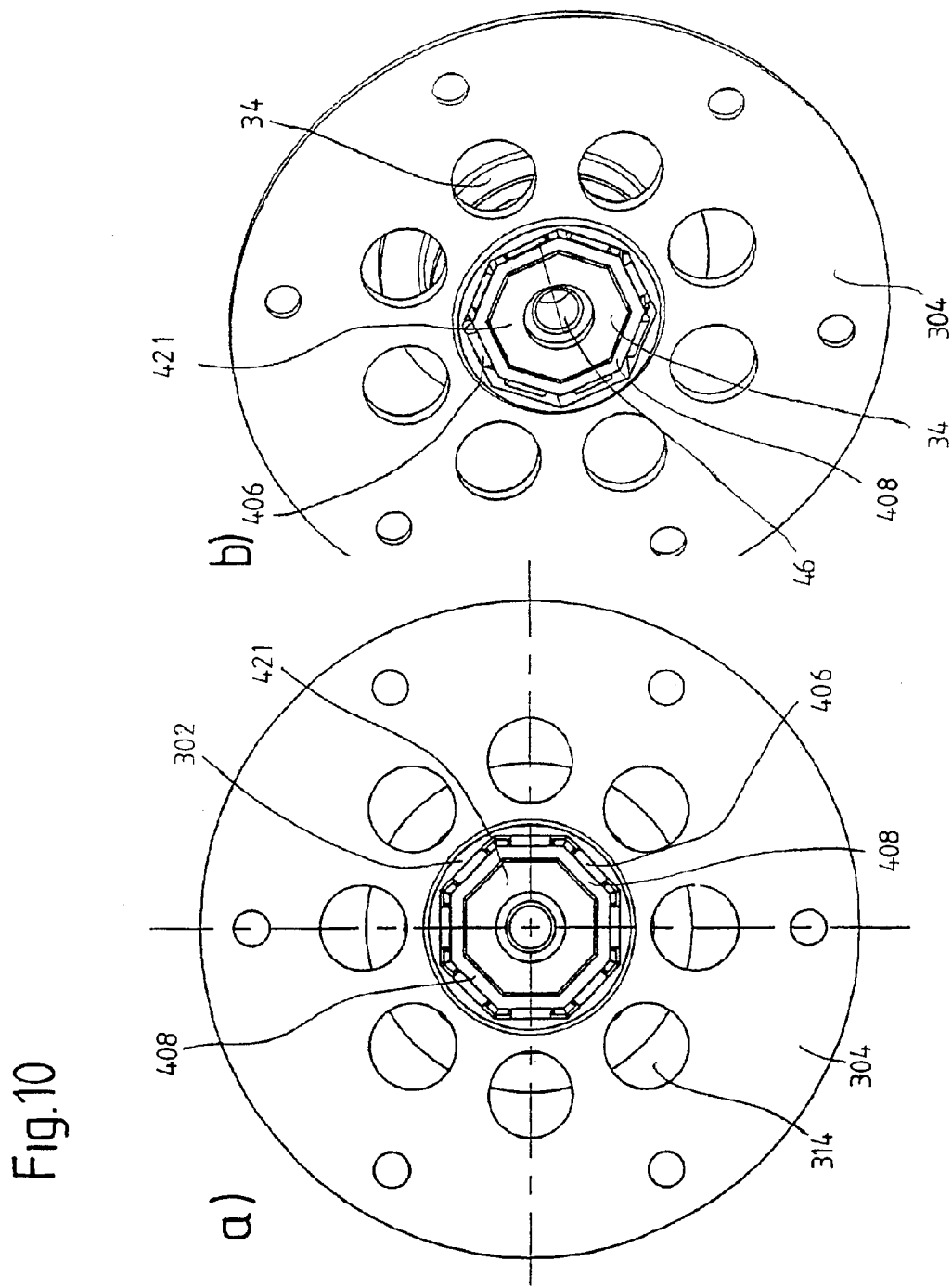
FIG. 10 shows the arrangement in FIG. 9 in an axial top view in direction of the input side of the dual clutch (FIG. 10a) and in a slightly diagonal view in direction of the input side of the dual clutch (FIG. 10b)

FIG. 9 shows a section through the rotary driving insertion connection in the assembled state, that is, in the state in which the projecting portion or external polygon 420, including the group 406, 408 of coupling elements 406 surrounding the latter, is inserted in the cutout 402 of the hub 302 defined by the internal polygon 422. FIG. 10 shows two supplemental views of the arrangement shown in FIG. 9. The axial end face 421 of the external polygon 420 is also referred to as the projecting portion. The drawing shows the group of coupling elements 406 which is received between the outer circumference of the external polygon 420 and the inner circumference defining the cutout 402, including the coupling element cage 408 which holds together the individual coupling elements and positions them in a reference position area. Further, an axial bore hole with an internal toothing 46 for the pump drive shaft 26 (compare FIG. 1) and an area 180' (see also FIG. 9) for the closure element 180 are shown in the input hub 34 and in the projecting portion of the input hub, respectively.

Figure 11:
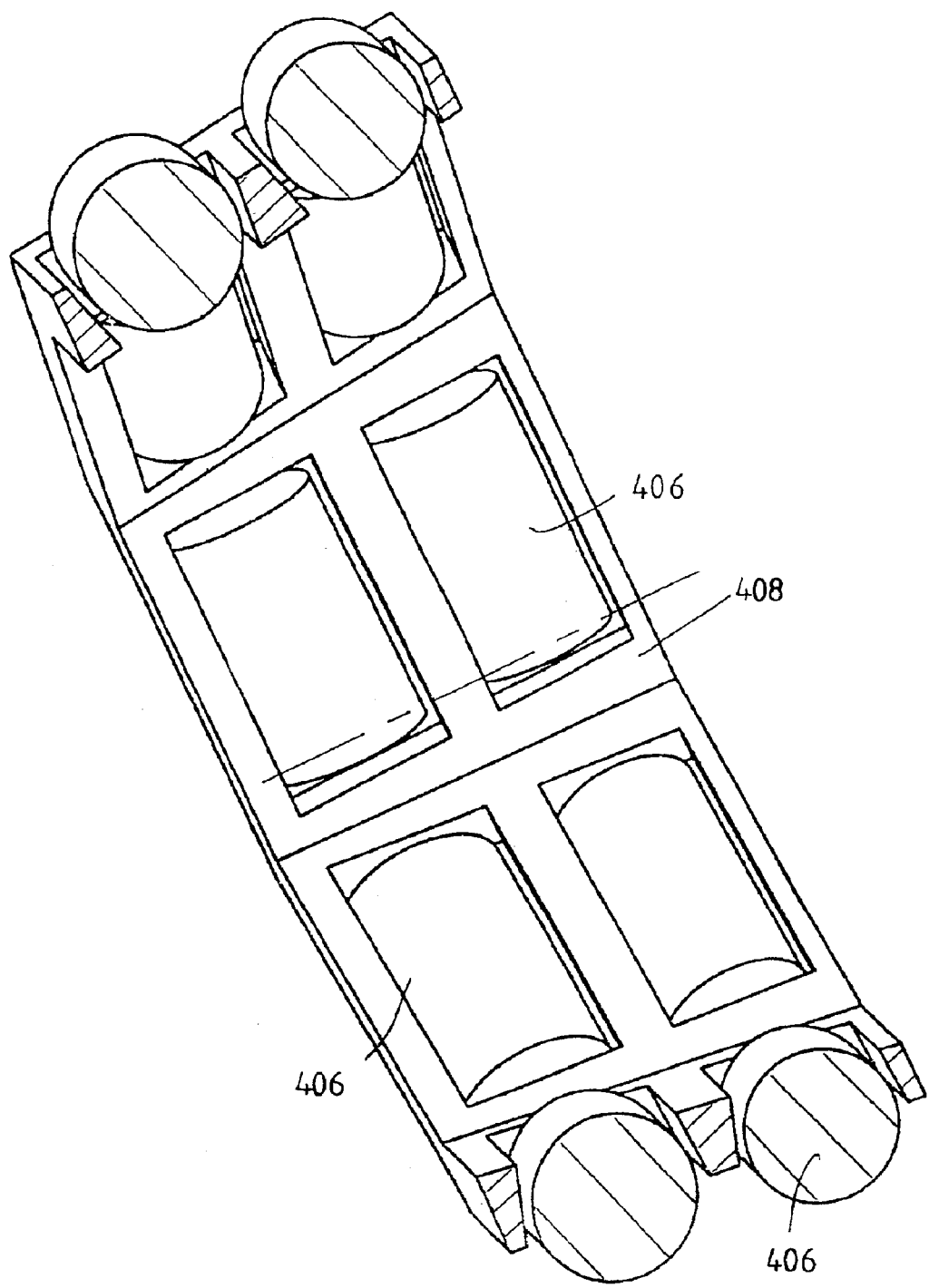
FIG. 11 shows a sectional perspective view of the coupling element cage, including coupling elements received therein in the form of rolling cylinders.

FIG. 11 is a sectional view showing the coupling element cage 408, including coupling elements 406 received therein. The coupling elements 406 have movement play in radial and axial direction in the cage. The portions of the cage formed to receive the coupling elements are constructed in such a way that it impossible for the rollers to fall radially inward. For this purpose, the receiving portions are constructed as troughs which become narrow axially in radial inward direction and have through-openings located on the inside which are narrower axially than the diameter of the coupling elements 406 constructed as rollers.

As was mentioned above, the rollers 406 have zero play in the cage 408 within certain limits and can accordingly be individually adapted to the wedge gap formed by the outer circumference and inner circumference. At engine speed, the rollers 406 are moved by centrifugal force in the direction of taper of the wedge gap until they produce the positive, substantially zero-play rotary driving engagement between the inner circumference and the outer circumference, so that the torque is now transmitted in a positive engagement by means of the rotary driving insertion connection.

The purpose of the coupling element cage 408 is to hold together the coupling elements (for example, the rollers 406 or coupling elements of other shapes such as wedge plates) for improved handling and to keep them in a determined position relative to one another until the rotary driving insertion connection is produced. However, the cage keeps the coupling elements free from play as mentioned above, so that any play remaining when the primary-side coupling area is joined with the secondary-side coupling area, that is, when the projecting portion is inserted into the cutout with the coupling element group arranged therebetween, can be compensated by a corresponding displacement of the coupling elements.

Figure 12:
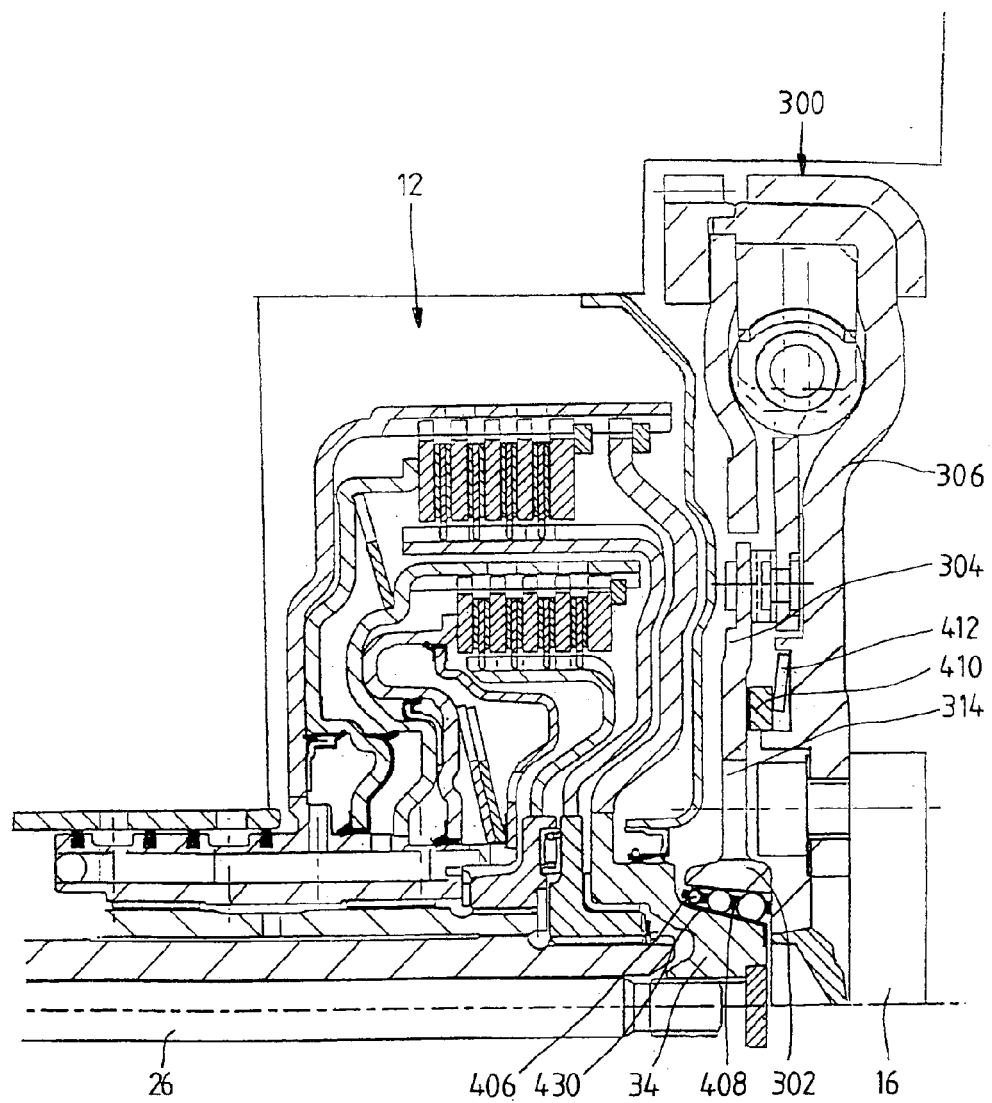
FIG. 12 shows another construction variant of the arrangement shown in FIG. 4.

FIG. 12 shows a construction variant of the arrangement in FIG. 5 in which the coupling elements 406 do not act directly on the projecting portion or external polygon of the coupling hub 34 but, rather, on a spring element 430 which is arranged at the hub 34 so as to be fixed with respect to rotation relative to it and which is shown in an axial view in FIG. 13a and in a sectional view in FIG. 13b. The spring element 430 has spring tongues 432 which are offset relative to one another in circumferential direction and which are contiguous with one another in one piece along an annular portion 434 of the spring element. The individual tongues 432 are separated from one another in circumferential direction by gaps 436 and can accordingly be deflected independent from one another in radial direction against respective spring-restoring forces.

Together with their radial outer surfaces, the spring tongues form an outer circumference which is interrupted by the gaps 436 and which is acted upon by the coupling elements 406. A spring tongue 432 is associated with every plane wedge surface of the external polygon of the coupling hub 34 and projects slightly from the respective wedge surface without being acted upon by the coupling elements. When acted upon by the coupling elements, the spring tongues 432 are deflected radially inward at most far enough so that they rest on the respective wedge surface of the coupling hub by their radial outer surfaces. The spring element 430 is designed in such a way with respect to the external polygon 420 of the hub 34 that a positive rotary driving engagement occurs between the spring tongues 432 and the wedge surfaces, so that any fastening means provided for fastening the spring element to the hub 34 are not loaded in circumferential direction during operation, that is, the torque to be transmitted need not be absorbed.

The spring element 430 can be permanently arranged, e.g., fixedly welded, at the hub 34 or can be held in a positive engagement by fastening means. However, it is certainly also possible that the spring element is only placed on the projecting portion or, alternatively, inserted into the cutout without the need for special steps to fix the spring element. After the rotary driving insertion connection has been produced, that is, after the projecting portion has been inserted into the cutout, e.g., corresponding to the view in FIG. 12, the spring element can be held at an axial reference position, or is even displaced into these reference positions during operation, by the interaction of the outer circumference (or, alternatively, the inner circumference) and the coupling elements.

The purpose of the spring element 430 is to compensate for radial offset or relative tilting of the axis of rotation of the dual clutch 12 on the one hand and of the driven shaft (particularly the crankshaft) of the drive unit on the other hand. For this purpose, the coupling elements are held in their (play-free) position which they have just come to occupy and which produces the rotary driving engagement, specifically, during their rotation in the rotating direction, also in those rotational angle areas in which a relief of the respective coupling element would result from the axial offset or axial tilting due to a momentary radial expansion of the wedge gap in this rotational angle area.

Assuming that the rotary driving insertion connection has just been produced when the drivetrain is joined and the coupling elements are still located in an assembly position in which they have play, a displacement of the coupling elements into their engagement position is carried out under centrifugal force during the first operation. When there is a radial offset or tilting between the axes of rotation, the coupling elements move in the direction of the engagement position, possibly only in a determined rotational angle range in which the radial width of the wedge gap between the radial outer surface of the respective spring tongue and the associated wedge surface of the inner circumference is increased compared to the radial width in other rotational angle positions, while in the rest of the rotational angle positions the respective coupling element is clamped between the radial outer surface of the spring tongue and the associated wedge surface of the inner circumference and is held in the position that is reached.

With respect to a rotary driving insertion connection of the kind mentioned above which takes effect between a dual mass flywheel (or a torsional vibration damper arrangement) and another unit, the dual clutch in the present case, the dual mass flywheel or the torsional vibration damper arrangement can also contribute to the above-mentioned radial compensation in that the secondary side 304 of the flywheel or of the torsional vibration damper has a certain radial play relative to the primary side 306 of the flywheel or of the torsional vibration damper.

Figure 14:
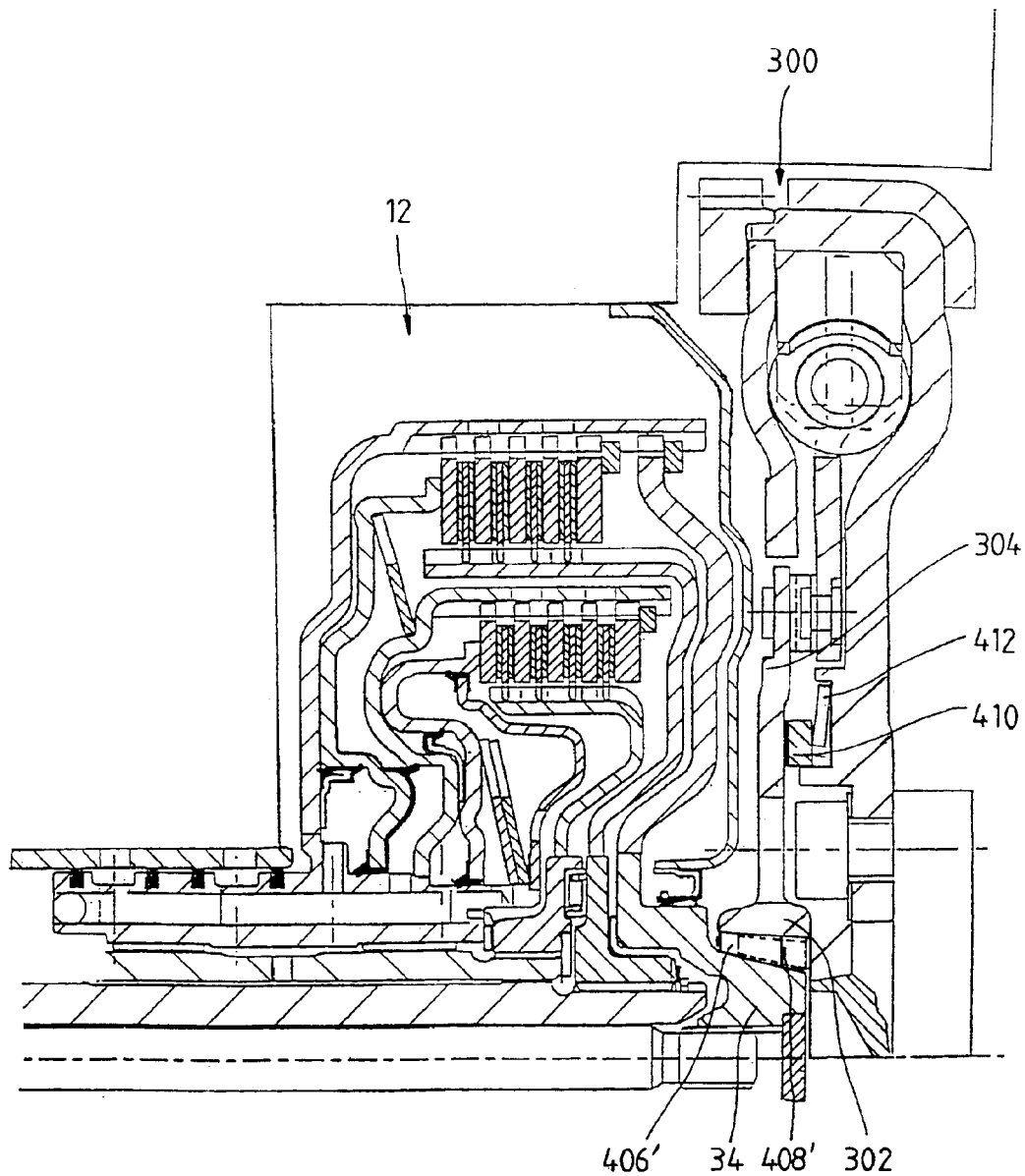
FIG. 14 shows another embodiment example, according to the invention, of a dual clutch with a dual mass flywheel arranged in front of it, in which wedge-shaped sliding plates (wedge plates) are provided as coupling elements.

FIG. 14 shows an embodiment example of a rotary driving insertion connection according to the invention and an arrangement, according to the invention, comprising a dual clutch 12, rotary driving insertion connection and dual mass flywheel 300, in which the insertion connection has wedge plates 406' as coupling elements. These wedge plates 406' can likewise be held together and positioned by a corresponding coupling element cage 408'. The wedge plates slide at the inner circumference of the hub 302 in the direction of the transmission under the action of centrifugal force until they have reached the engagement position in which they produce the positive rotary driving engagement substantially without rotational play between the hub 302 and the secondary side of the dual mass flywheel and input hub 34 of the dual clutch. In the engagement position, the wedge plates preferably act along the surface of an associated wedge surface of the external polygon of the input hub 34 and an associated wedge surface of the inner circumference of the hub 302, so that the area pressing at the wedge surfaces is correspondingly reduced. In order to be able to absorb radial offset or tilting of the axes of rotation with respect to one another, the wedge elements can be combined with a spring element of the type shown in FIG. 13.

Figure 15:
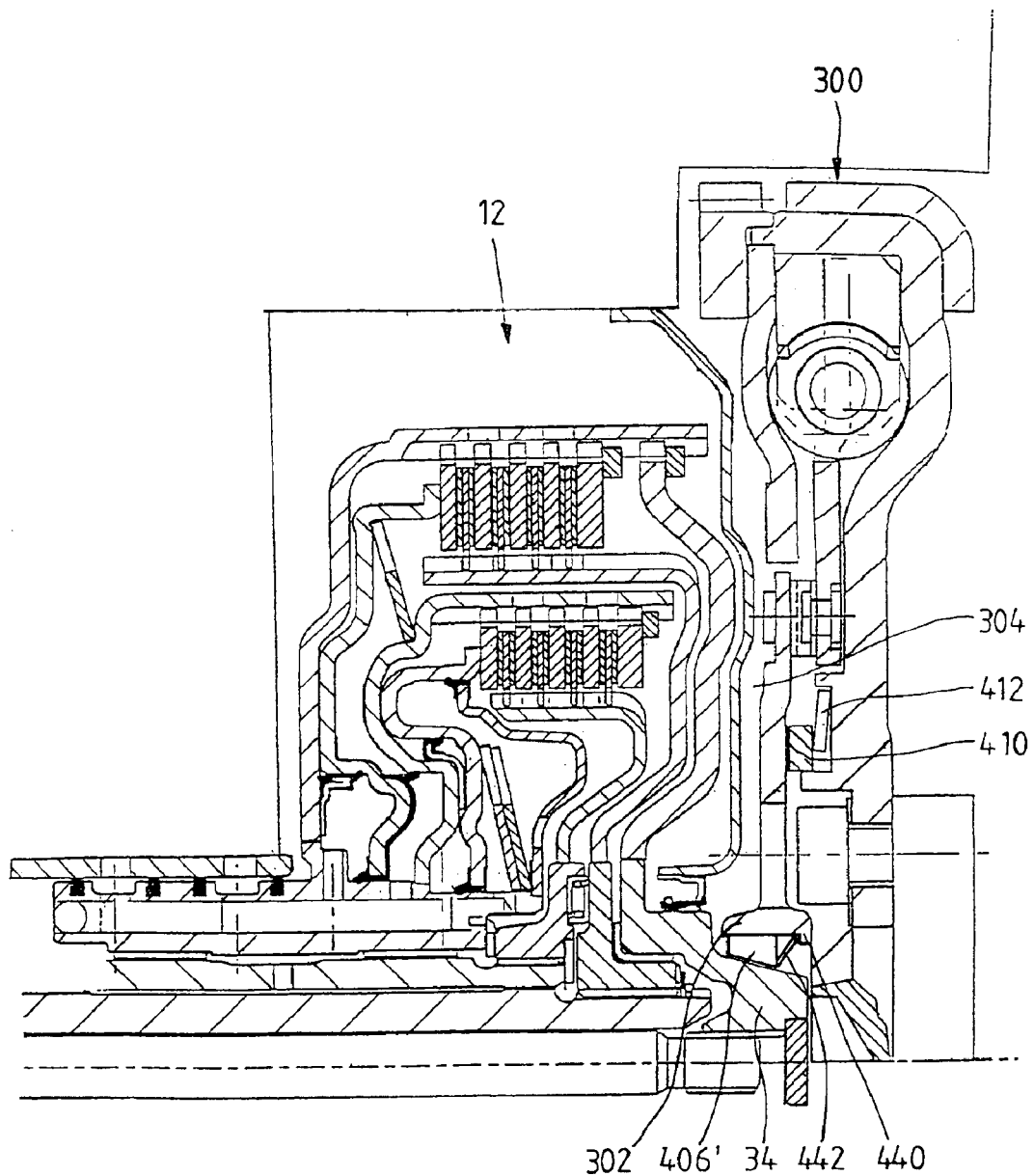
FIG. 15 shows a construction variant of the arrangement in FIG. 14 in which the wedge plates are pretensioned by a spring arrangement in an engagement position which brings about the positive rotary driving engagement.

In the embodiment examples described above, the displacement of the coupling elements into the engagement position was based on the centrifugal force occurring during operation. In contrast, the displacement of the coupling elements into the engagement position can also be carried out based on other forces, e.g., spring forces. FIG. 15 shows a corresponding embodiment example in which wedge plates 406' are provided as coupling elements as in the embodiment example in FIG. 14. The coupling elements 406' are pressed into the wedge gap formed between the inner circumference and the outer circumference in the direction in which the wedge gap tapers by means of a spring ring 442 which is supported at an annular collar 440 of the hub 302. When the drivetrain is assembled, that is, when the rotary driving insertion connection is assembled, the coupling elements 406' can carry out axial and/or radial deflecting movements against the spring force of the annular spring 442 depending on the construction of the insertion connection so as to compensate for tolerances.

Figure 16:
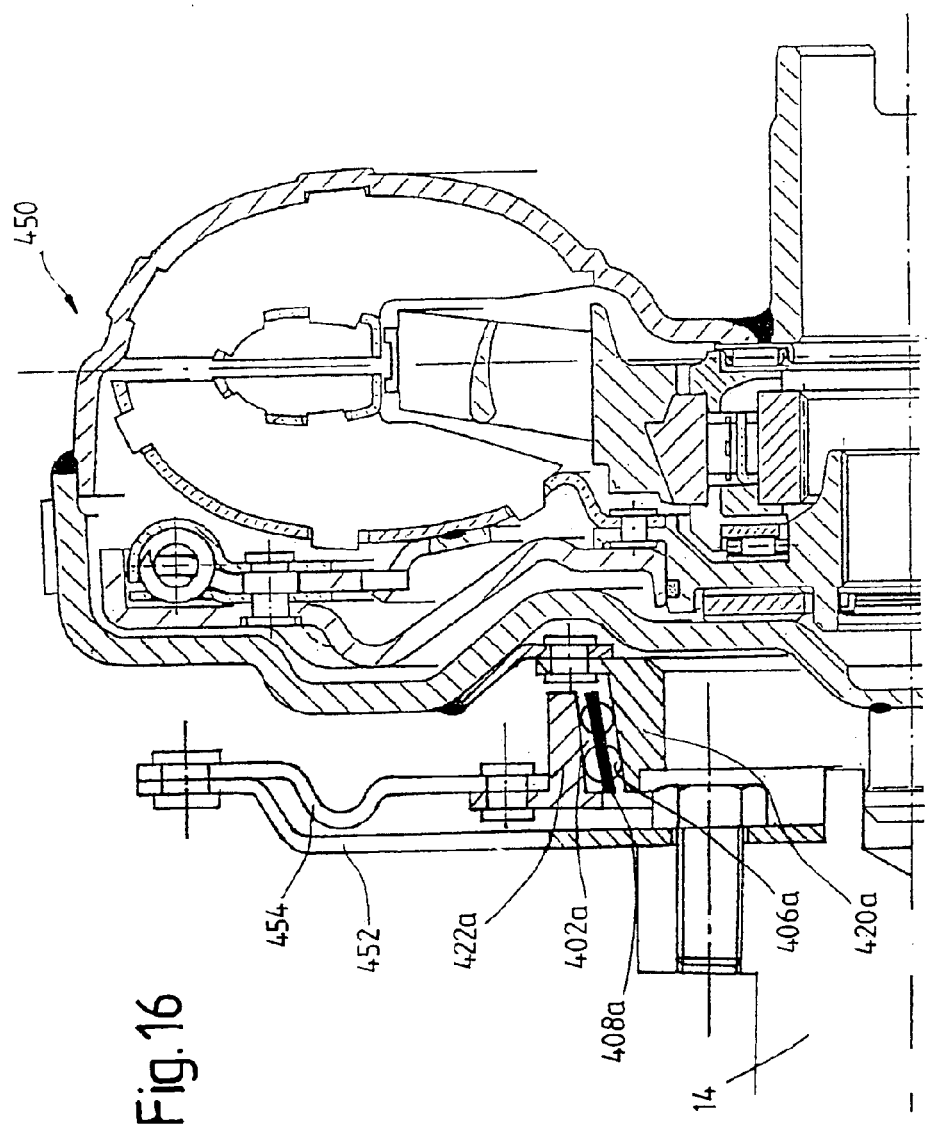
FIG. 16 shows an embodiment example for the use of the rotary driving insertion connection, according to the invention, for coupling a torque converter to a drive unit.

The embodiment examples described above related to a drivetrain in a motor vehicle, specifically to a torque transmission connection between a dual mass flywheel (or torsional vibration damper) and a dual clutch. However, the inventive suggestion is also applicable in principle to any rotary driving connections or torque transmission connections in a motor vehicle drivetrain or in a completely different context. FIG. 16 shows an example, also from automotive engineering, in which a torque converter 450 is coupled to the crankshaft 14 of an internal combustion engine by a rotary driving insertion connection according to the invention. Similar to the embodiment forms in FIGS. 6 to 11, the rotary driving insertion connection is formed by an external polygon 420a, an internal polygon defining a cutout 402a, and coupling elements 406a which are received in the wedge gap formed between the latter. If desired, the coupling elements 406a can be grouped to form a coupling element group by a coupling element cage 408a (or, generally, a grouping arrangement). A torque converter central driver in which the internal polygon 422a is connected by a flexplate 452 and spring tongues 454 arranged at the latter to the crankshaft 14 so that they rotate jointly is implemented in FIG. 16. The flexplate 452 and the spring tongues 454 together have a defined radial elasticity which can absorb the axial offset or axial tilting between the axes of rotation of the crankshaft 14 and torque converter 450.

An axial counterforce acting against the ejection of the coupling elements 406a during operation can be carried out in a torque converter, if desired, with exclusive reliance on the free thrust in axial direction which occurs in operation and which relies on hydrodynamic interactions. Referring once again to the embodiment forms with the dual mass flywheel, this axial counterforce is applied, for example, by a plate spring (see plate spring 412) in the dual mass flywheel by means of a bearing (particularly a sliding bearing), to the hub of the secondary side of the dual mass flywheel (see hub 302) and is supported by means of the input hub 34 of the dual clutch and the axial bearing support of the dual clutch. In both application situations, the cone angle is preferably selected in such a way that the axial force component remains small, but (in case of coupling elements which are displaceable into the engagement position by centrifugal force) play compensation is also achieved sufficiently quickly when starting the engine.

It should also be noted that in the course of research conducted on the part of the present applicant, the use of at least one conical projecting portion and at least one correspondingly shaped cutout, also without coupling elements acting therebetween, was considered as a rotary driving insertion connection. Torque transmission by means of a rotary driving insertion connection of this kind, in which the inner circumference and the outer circumference engage with one another directly in a positive locking manner, unquestionably makes possible a permissible torque transmission which is also substantially free from play when appropriately constructed. However, the disadvantage in constructing the rotary driving insertion connection in this way without movable coupling elements consists in that a flat cone angle which is selected in order to achieve self-locking creates tolerance problems in assembly such that a comparatively small radial tolerance can be compensated only by means of a large axial displacement between the inner circumference and the outer circumference. This problem is prevented or at least greatly mitigated by interposing the movable coupling elements because the tolerance compensation which is always necessary in practice is carried out at least predominantly by the coupling elements themselves.

It was assumed in the embodiment examples described above that the coupling elements are held together and held in a reference position for assembly by a coupling element cage. In general, it is suggested that the coupling elements or at least a portion of the plurality of coupling elements are held by a grouping arrangement to form a coupling element group which can be handled as a unit and/or held in a reference position relative to the associated inner circumference and/or relative to the associated outer circumference.

Figure 17:
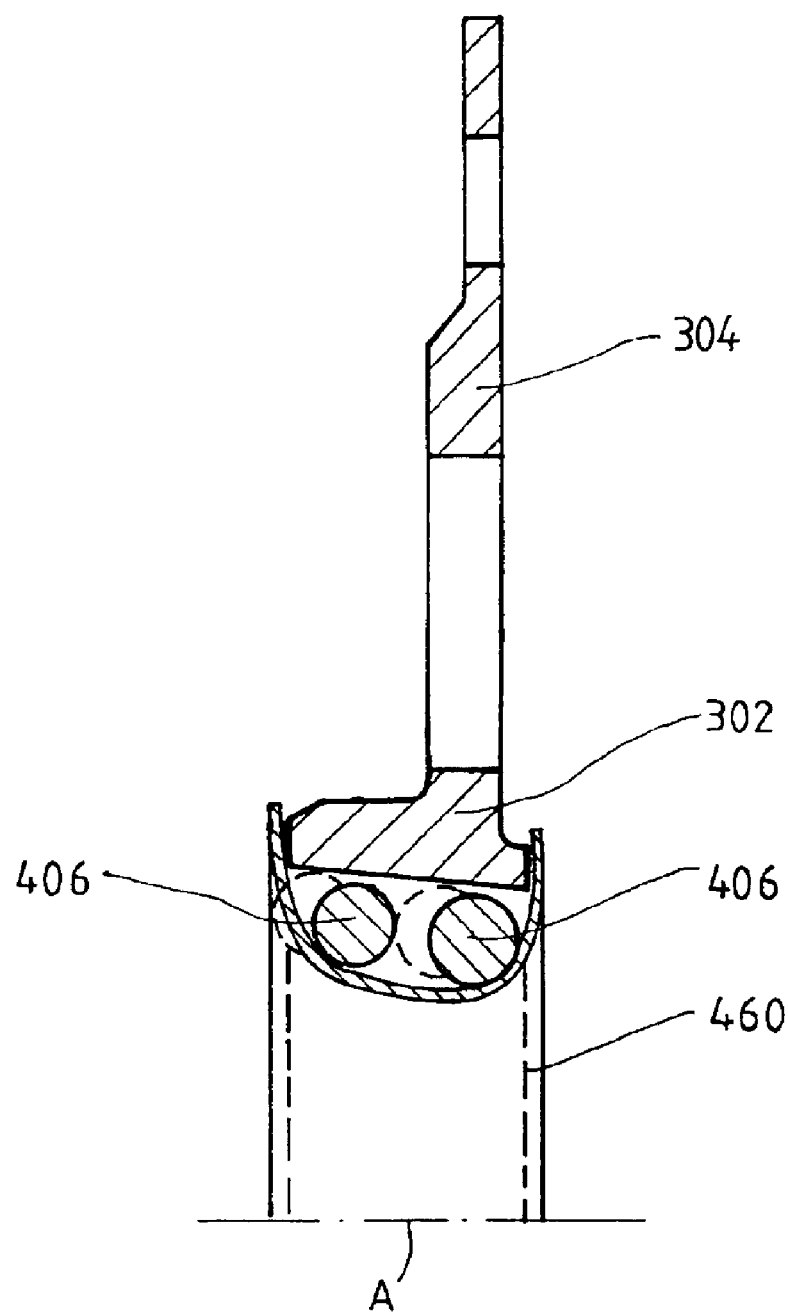
FIG. 17 illustrates a possibility for holding coupling elements for mounting in a ready position (assembly position) using a strip material or layer material.

FIG. 17 shows an example in which the coupling elements 406 which are again constructed as rollers are held by a foil (e.g., a plastic foil or thin metal foil) in contact with the inner circumference. The foil 460 is approximately U-shaped in cross section and encloses the inner circumference of the hub 302, including the coupling elements 406, annularly from the radial inner side. The foil 460 call be fastened, e.g., glued, to axially directed annular surfaces on both axial sides of the hub 302 and held in a positive engagement. The embodiment example in FIG. 17 is based on the insight that it is also sufficient, in principle, to hold the elements in a suitable initial position in some manner for a simple initial assembly of the insertion connection; when foil is used, the coupling elements are pressed through the foil to the contact surface of the other part, in the present case the external polygon, at the start of operation. The foil 460 can remain in place since it is not disturbed further during operation. FIG. 17 shows the coupling elements 406 in their assembly position in solid lines and in an assumed engagement position in dashed lines.

Figure 18:
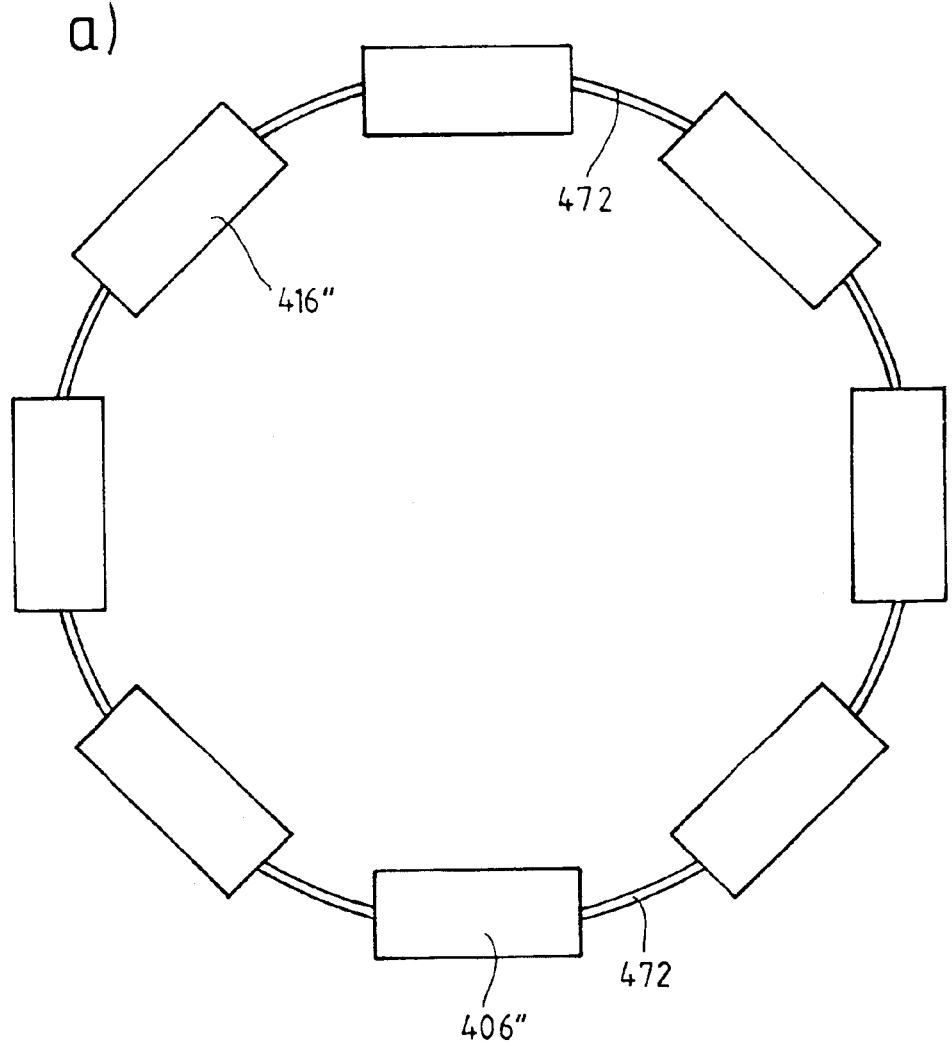
FIG. 18 shows a composite of coupling elements (FIG. 18a) which are held together by an elastomer material ring and an axial view (FIG. 18b) of an individual coupling element which is constructed as a rolling cylinder and has an axial bore hole for the elastomer material ring.

FIG. 18 shows another possibility for grouping a plurality of coupling elements in a coupling element group which can be handled as a unit. In this case, the coupling elements are again constructed as rolling cylinders 406", but have an axial bore hole 470 through which an elongated elastomer member 472 constructed as a ring extends. FIG. 18 gives an example for connecting the coupling elements to form an elastomer composite which gives sufficient access to the coupling elements for compensation of tolerances and produces the positive rotary driving engagement substantially without of play by displacement into the engagement position.

Figure 19:
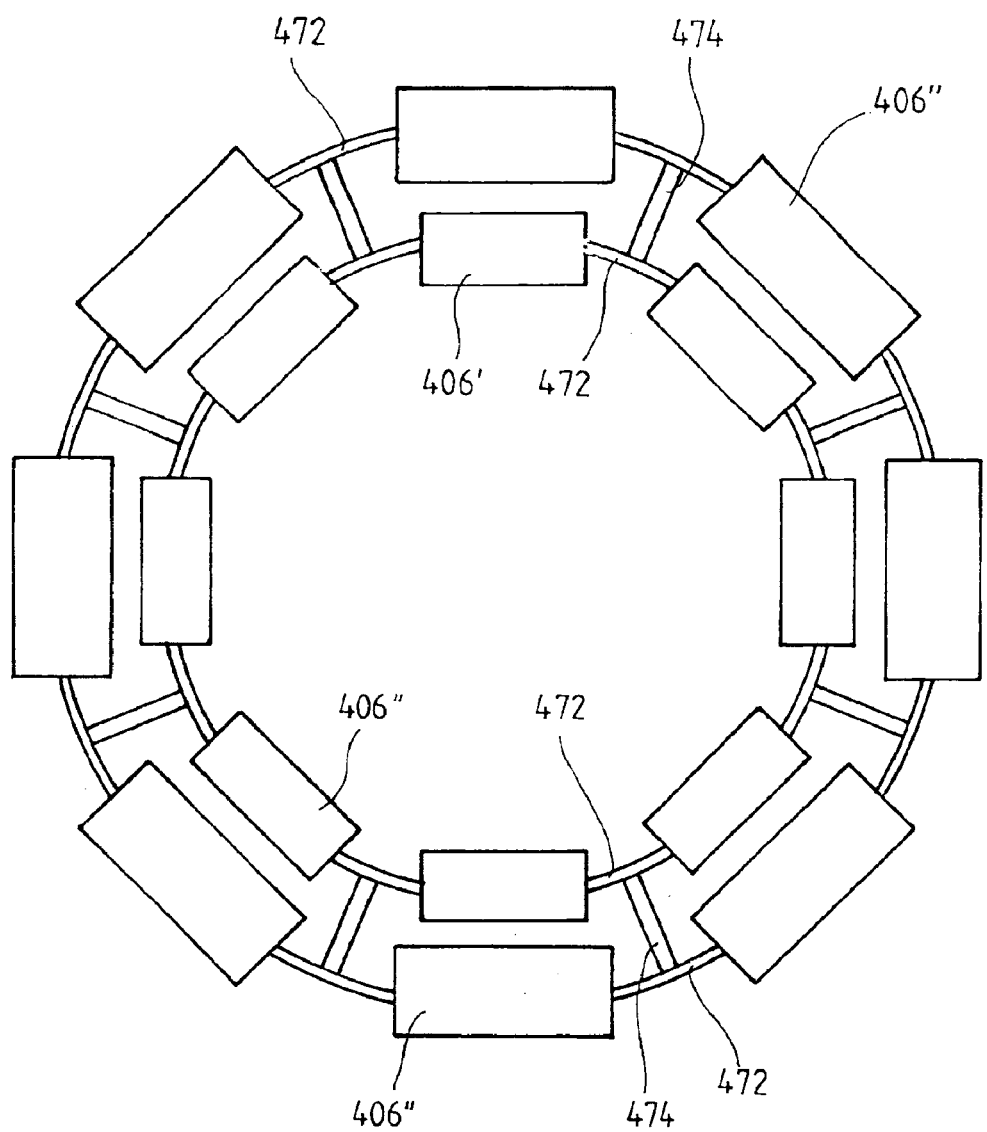
FIG. 19 shows another example in which coupling elements are connected by means of at least one elastomer material element to form an elastomer composite.

While only one ring of coupling elements 406" held together by the elastomer element 472 is provided in FIG. 18, FIG. 19 shows an example in which two rings of this type are provided and are connected by elastomer connection webs 474 and can be arranged so as to be offset axially relative to one another, for example, for receiving them axially adjacent to one another in a wedge gap between an inner circumference and an outer circumference of a rotary driving insertion connection according to the invention.

It is noted that FIGS. 18 and 19 only show examples of how a plurality of coupling elements can be connected to form an elastomer composite by means of elastomer material. Another possibility consists, for example, in receiving, e.g., embedding, the coupling elements that are to be connected jointly in correspondingly shaped elastomer material.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A rotary driving insertion connection for transmitting torque between first and second components of a drive train of a motor vehicle, said components having an axis of rotation, said connection comprising:
   a primary side coupling area at said first component, said primary side coupling area having a cutout with an inner circumference,
   a secondary side coupling area at said second component, said secondary side coupling area having a projection with an outer circumference, said projection being axially inserted into said cutout, said inner circumference and said outer circumference defining therebetween a gap having a width which decreases in an axial direction, one of said outer circumference and said inner circumference having a radius which decreases in the axial direction in which the gap width decreases, and
   a plurality of coupling elements arranged in said gap so that a positive rotary driving engagement which is free of rotational play can be effected between said primary side coupling area and said secondary side coupling area.

2. An insertion connection as in claim 1 wherein said coupling elements are moveable with respect to said inner circumference and said outer circumference, said coupling elements being moveable into an engagement position in which they effect a positive rotary driving engagement which is free of rotational play between said primary side coupling area and said secondary side coupling area.

3. An insertion connection as in claim 2 wherein said coupling elements are moveable between said engagement position and an assembly position, said coupling elements in said assembly position being positioned so that said projecting portion can be inserted into said cutout with play.

4. An insertion connection as in claim 2 wherein said coupling elements can be moved into said engagement position by centrifugal force when said components are rotating.

5. An insertion connection as in claim 2 further comprising a spring arrangement which urges said coupling elements into said engagement position.

6. An insertion connection as in claim 1 further comprising means for holding said coupling elements as a group which can be positioned with respect to one of said inner circumference and said outer circumference during assembly.

7. An insertion connection as in claim 6 wherein said means for holding said coupling elements as a group comprises a cage for said coupling elements, wherein said group can be handled as a unit.

8. An insertion connection as in claim 7 wherein said cage is constructed to ensure at least one of radial and axial play of said coupling elements.

9. An insertion connection as in claim 6 wherein said means for holding said coupling elements as a group comprises at least one elastomeric element.

10. An insertion connection as in claim 6 wherein means for holding said coupling elements as a group comprises at least one strip material element which connects said coupling elements.

11. An insertion connection as in claim 1 wherein said outer circumference has a radius which increases in the axial direction in which the gap width decreases.

12. An insertion connection as in claim 11 wherein said outer circumference has a radius which increases in the axial direction to a greater extent than the radius of the inner circumference as the gap width decreases.

13. An insertion connection as in claim 1 wherein said inner circumference has a radius which increases in the axial direction in which the gap width decreases.

14. An insertion connection as in claim 1 wherein one of said inner circumference and said outer circumference is formed by surfaces which are circumferentially offset with respect to one another.

15. An insertion connection as in claim 1 wherein at least one of said inner circumference and said outer circumference is radially elastic.

16. An insertion connection as in claim 15 wherein one of said cutout and said projection comprises a spring arrangement which forms a respective at least one of said inner circumference and said outer circumference.

17. An insertion connection as in claim 16 wherein one of said inner circumference and said outer circumference is formed by surfaces which are circumferentially offset with respect to one another, said spring arrangement comprising an annular portion and spring tongues which are contiguous with said annular portion.

18. An insertion connection as in claim 1 wherein said primary side coupling area has an internal polygon forming said inner circumference.

19. An insertion connection as in claim 1 wherein said secondary side coupling area has an external polygon forming said outer circumference.

20. An insertion connection as in claim 1 wherein said coupling elements comprise one of rolling bodies and sliding bodies.

21. An insertion connection as in claim 1 wherein said coupling elements comprise one of balls, cylinders, and wedge plates.

22. A motor vehicle drive train comprising an insertion connection between a drive unit and a transmission, said insertion connection comprising:
   a primary side coupling area at said first component, said primary side coupling area having a cutout with an inner circumference, a secondary side coupling area at said second component, said secondary side coupling area having a projection with an outer circumference, said projection being axially inserted into said cutout, said inner circumference and said outer circumference defining therebetween a gap having a width which decreases in an axial direction, one of said outer circumference and said inner circumference having a radius which decreases in the axial direction in which the gap width decreases, and a plurality of coupling elements arranged in said gap so that a positive rotary driving engagement which is free of rotational play can be effected between said primary side coupling area and said secondary side coupling area.

23. A motor vehicle drive train as in claim 22 further comprising at least one of a torsional vibration damper and a dual mass flywheel arranged between said dive unit and said insertion connection.

24. A motor vehicle drive train as in claim 22 further comprising at least one of clutch device and a torque converter between the transmission and the insertion connection.

25. A motor vehicle drive train as in claim 24 comprising a dual clutch having a first clutch arrangement associated with a first transmission input shaft and a second clutch arrangement associated with a second transmission input shaft.

26. A rotary driving insertion connection for transmitting torque between first and second components of a drive train of a motor vehicle, said components having an axis of rotation, said connection comprising:

a primary side coupling area at said first component, said primary side coupling area having a cutout with an inner circumference, a secondary side coupling area at said second component, said secondary side coupling area having a projection with an outer circumference, said projection being axially inserted into said cutout, wherein one of said cutout and said projection comprises a spring arrangement which forms a respective one of said inner circumference and said outer circumference, said spring arrangement comprising an annular portion and a plurality of radially resilient spring tongues which are contiguous with said annular portion, and a plurality of coupling elements arranged between said inner circumference and said outer circumference so that a positive rotary driving engagement which is free of rotational play can be effected between said primary side coupling area and said secondary side coupling area.

* * * * *